US008602172B2

(12) United States Patent
Suzuki et al.

(10) Patent No.: US 8,602,172 B2
(45) Date of Patent: Dec. 10, 2013

(54) ELEVATOR GROUP MANAGEMENT SYSTEM

(75) Inventors: Naohiko Suzuki, Tokyo (JP); Masafumi Iwata, Tokyo (JP); Shingo Kobori, Tokyo (JP); Sakurako Tokura, Tokyo (JP); Yoshimasa Koba, Tokyo (JP); Kouji Takeshima, Aichi (JP); Masayuki Mitsuda, Aichi (JP); Yoshinori Nonami, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 453 days.

(21) Appl. No.: 13/125,143

(22) PCT Filed: Sep. 18, 2009

(86) PCT No.: PCT/JP2009/066395
§ 371 (c)(1),
(2), (4) Date: Apr. 20, 2011

(87) PCT Pub. No.: WO2010/047201
PCT Pub. Date: Apr. 29, 2010

(65) Prior Publication Data
US 2011/0198160 A1 Aug. 18, 2011

(30) Foreign Application Priority Data
Oct. 20, 2008 (JP) ................................. 2008-269612

(51) Int. Cl.
*B66B 1/18* (2006.01)
(52) U.S. Cl.
USPC ........................................ 187/382; 187/391
(58) Field of Classification Search
USPC ........................ 187/247, 380–389, 391–393
See application file for complete search history.

(56) References Cited

U.S. PATENT DOCUMENTS 5,679,932 A * 10/1997 Kim .............................. 187/382
5,780,789 A * 7/1998 Tsuji ............................. 187/382

(Continued)

FOREIGN PATENT DOCUMENTS

| CN | 101044078 A | 9/2007 |
| CN | 101054141 A | 10/2007 |

(Continued)

OTHER PUBLICATIONS

Combined Office Action and Search Report issued May 30, 2013 in Chinese Application No. 200980141671.7 (With English Translation of the Search Report).

(Continued)

*Primary Examiner* — Anthony Salata
(74) *Attorney, Agent, or Firm* — Oblon, Spivak, McClelland, Maier & Neustadt, L.L.P.

(57) ABSTRACT

A car-based running power computing mechanism computes running power values of each car in both cases including cases before and after a newly generated hall call is assigned. A car-based regenerative power computing mechanism computes regenerative power values of each car in the both cases. A car-based future running power computing mechanism computes future running power values of each car in the both cases. A car-based future regenerative power computing mechanism computes future regenerative power values of each car in the both cases. A car-based assigned total evaluation index computing mechanism obtains an in-travel power consumption value and an in-future-travel power consumption value based on the running power values, regenerative power values, future running power values, future regenerative power values and the like, to thereby compute assigned total evaluation indices of each car in the both cases. An assigned car deciding mechanism decides an assigned car based on the assigned total evaluation indices.

16 Claims, 13 Drawing Sheets

(56) References Cited

U.S. PATENT DOCUMENTS

| | | | |
|---|---|---|---|
| 5,896,948 A * | 4/1999 | Suur-Askola et al. | 187/290 |
| 6,672,431 B2 * | 1/2004 | Brand et al. | 187/382 |
| 6,857,506 B1 | 2/2005 | Tyni et al. | |
| 7,032,715 B2 * | 4/2006 | Smith et al. | 187/380 |
| 7,416,057 B2 * | 8/2008 | Kostka | 187/382 |
| 7,568,556 B2 | 8/2009 | Hikita | |
| 7,743,890 B2 * | 6/2010 | Nikovski et al. | 187/382 |
| 7,909,143 B2 * | 3/2011 | Tyni et al. | 187/382 |
| 7,913,819 B2 * | 3/2011 | Siikonen et al. | 187/382 |
| 2005/0006183 A1 | 1/2005 | Smith et al. | |
| 2009/0032339 A1 | 2/2009 | Hikita | |
| 2010/0230213 A1 | 9/2010 | Kobori et al. | |
| 2012/0055742 A1 * | 3/2012 | Takeda | 187/382 |
| 2012/0138388 A1 * | 6/2012 | Finschi et al. | 187/247 |

FOREIGN PATENT DOCUMENTS

| | | | |
|---|---|---|---|
| CN | 101056812 A | | 10/2007 |
| DE | 698 18 080 T2 | | 4/2004 |
| GB | 2111244 A | * | 6/1983 |
| JO | 9 227033 | | 9/1997 |
| JP | 59 223672 | | 12/1984 |
| JP | 62 70 | | 1/1987 |
| JP | 1 14149 | | 3/1989 |
| JP | 5 319707 | | 12/1993 |
| JP | 2555834 B2 | | 11/1996 |
| JP | 3467951 B2 | | 11/2003 |
| JP | 2004 520251 | | 7/2004 |
| JP | 2006 143360 | | 6/2006 |
| JP | 2006-143360 | | 6/2006 |
| JP | 2007 520403 | | 7/2007 |
| WO | WO 03/101875 A1 | | 12/2003 |
| WO | 2007 049342 | | 5/2007 |
| WO | 2008 001508 | | 1/2008 |

OTHER PUBLICATIONS

German Office Action issued Jun. 19, 2012, in Patent Application No. 11 2009 002 588.9 (with English-language translation).
International Search Report issued Jan. 12, 2010 and International Preliminary Report on Patentability issued May 17, 2011 in PCT/JP09/66395 filed Sep. 18, 2009.

\* cited by examiner

F I G . 1
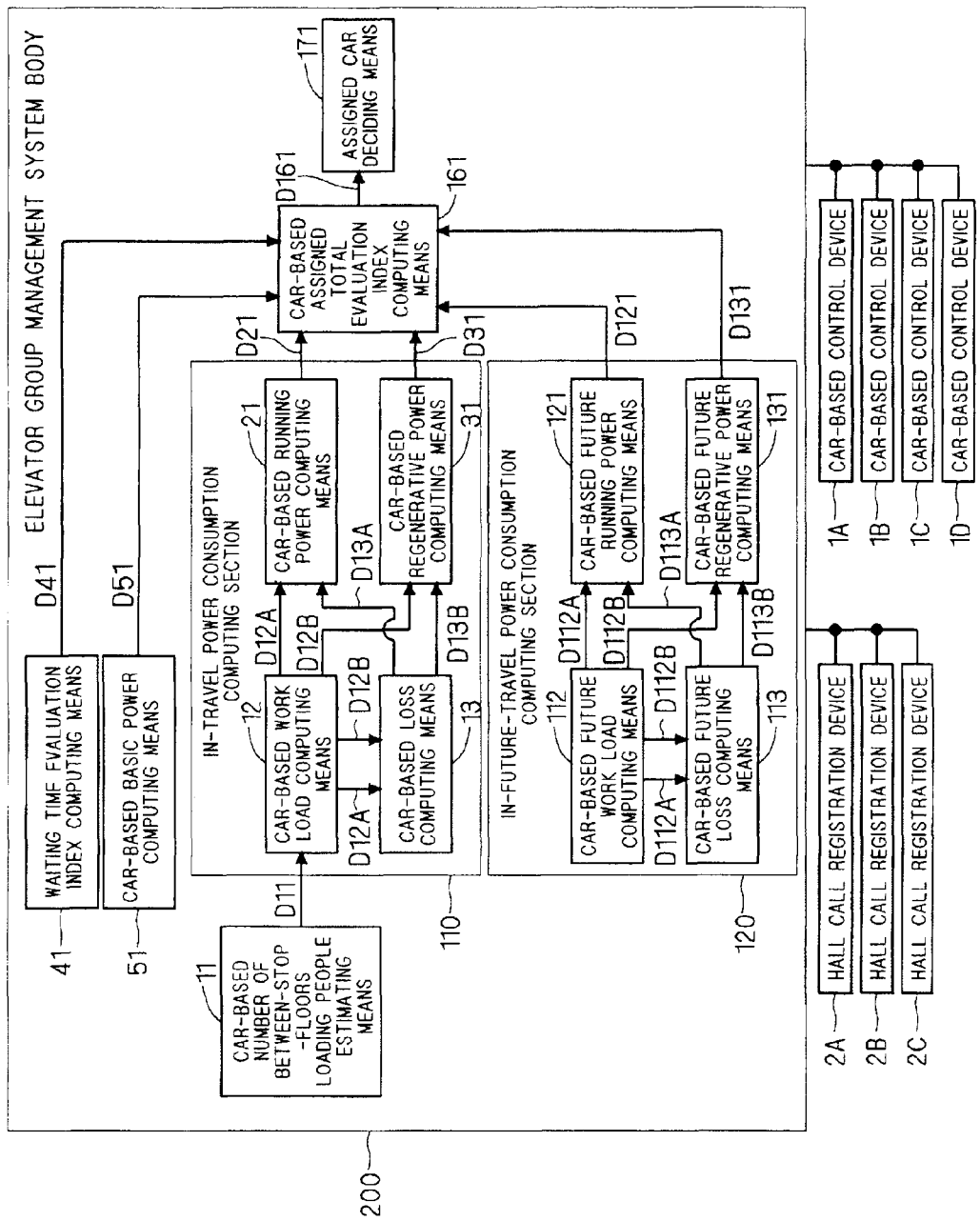

F I G . 7
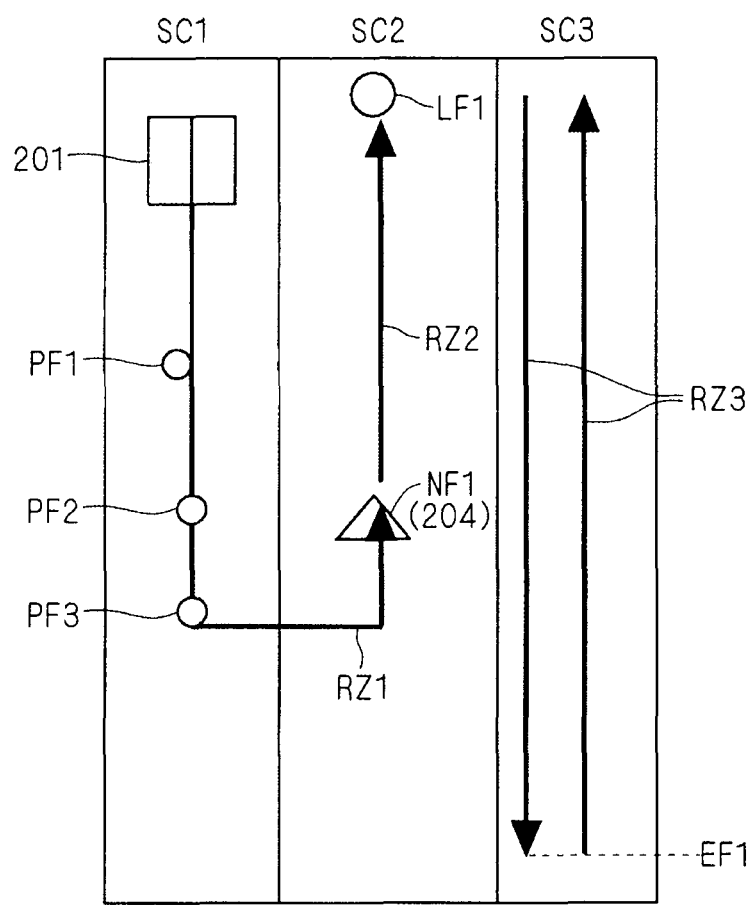

ELEVATOR GROUP MANAGEMENT SYSTEM

TECHNICAL FIELD

The present invention relates to an elevator group management system that reduces waiting times of passengers and power consumption by effectively operating a plurality of elevators.

BACKGROUND ART

In conventional elevator group management systems, a linear sum of an increment value of waiting time and an increment value of energy consumption is computed as a cost function for a newly generated hall call (call of an elevator in an elevator hall), and a car with the smallest cost function is decided as an assigned car to the newly generated hall call. The method of deciding an assigned car as described above is disclosed in, for example, Patent Document 1 as the method of assigning hall calls.

Further, Patent Document 2 discloses the method of evaluating the power consumption required for travel to destination floors corresponding to a currently generated hall call and a hall call, to thereby assign a car in response to a new hall call.

Further, Patent Document 3 discloses the assignment method of achieving, by the means for obtaining an estimated load evaluation value, easier assignment as the value of a car load evaluation value is closer to a balanced load.

Further, Patent Document 4 discloses the assignment method of deciding start intervals, assigned cars and the like according to a traffic flow for reducing power consumption evaluated from the car load. For example, car start intervals are controlled so as to obtain a balanced load at up peak. In addition, at down peak, hall calls are centered on one elevator or put on standby such that a car load upon arrival at a lobby floor becomes almost full and a motor load is reduced.

On the other hand, Patent Document 5 discloses the method of performing an assignment by evaluating the power consumption as a result of responses to all calls (during registration).

In addition, Patent Document 6 discloses the assignment method in which power consumption is taken into account in tuning a group management parameter with respect to a traffic flow.

PRIOR ART DOCUMENT

Patent Document

Patent Document 1: National Publication of Translation No. 2007-520403 (Claim 2)
Patent Document 2: Japanese Patent Publication No. 62-70
Patent Document 3: Japanese Patent Publication No. 01-14149
Patent Document 4: Japanese Patent Application Laid-Open No. 09-227033
Patent Document 5: Japanese Patent Application Laid-Open No. 2004-520251
Patent Document 6: Japanese Patent Application Laid-Open No. 59-223672

SUMMARY OF THE INVENTION

Problem to be Solved by the Invention

In the method of deciding an assigned car by the elevator group management system as described above, in a case where an increment value of energy consumption by a newly generated hall call is incorporated into an assigned total evaluation index and thus a travel section is included on a regeneration side due to the newly generated hall call, the increment value of energy consumption is a negative value or a small positive value. However, in a future travel section by an unknown call following the running section by existing calls including a new hall call, the travel section on a power running side increases in many cases, and thus an increase in energy consumption including a future running section is underestimated. This leads to a problem that an effect of energy saving is small.

The present invention, the present invention has been made to solve the above-mentioned problem, and an object thereof is to obtain an elevator group management system that is capable of reflecting not only in-travel power consumption in a travel section by a known call, which is expected to be covered, but also in-future-travel power consumption in a future travel section by an unknown call, and has a large energy saving effect without deteriorating the waiting time to a large extent.

Means to Solve the Problem

An elevator group management system according to a first aspect of the present invention decides any of a plurality of cars as an assigned car in response to a newly generated hall call, which includes: waiting time evaluation index computing means computing a waiting time evaluation index based on an estimated arrival time at a loading floor by the hall call for each of the plurality of cars in a first case before an assignment is made as the assigned car and a second case after an assignment is made as the assigned car, and outputting waiting time evaluation index information in which the waiting time evaluation index is specified; an in-travel power consumption computing section computing an in-travel power consumption value in a travel-expected section from a current position to a last stop position for each of the plurality of cars in each of the first and second cases, and outputting in-travel power consumption value information in which the in-travel power consumption value is specified, the travel-expected section being expected to be covered by a known call for each car; an in-future-travel power consumption computing section computing an in-future-travel power consumption value in a predetermined future travel-expected section following the last stop position of the travel-expected section expected to be covered by each car for each of the plurality of cars in each of the first and second cases, and outputting in-future-travel power consumption value information in which the in-future-travel power consumption value is specified; and an assigned car deciding section computing, based on the waiting time evaluation index information, in-travel power consumption value information and in-future-travel power consumption value information, an assigned total evaluation index before assignment and an assigned total evaluation index after assignment for each of the plurality of cars in the first and second cases and deciding, as the assigned car, a car with the smallest value of the assigned total evaluation index after assignment with respect to the assigned total evaluation index before assignment.

Effects of the Invention

The assigned car deciding section of the elevator group management system according to the first aspect decides, in response to a newly generated hall call, an assigned car based on the in-travel power consumption in a travel-expected section by a known call that is expected to be covered and the in-future-travel power consumption in a future travel-expected section by an unknown call. Accordingly, there is achieved an effect that energy is saved without deteriorating the waiting time to a large extent.

Further, the in-travel power consumption in a future travel-expected section by an unknown call following the travel-expected section by a known call that is expected to be covered is designated as an evaluation target for decision of an assigned car. Accordingly, even when the travel-expected section is on the regeneration side, it is possible to take into account the generation of in-travel power consumption on a power running side in a future travel-expected section.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram showing a configuration of an elevator group management system according to a first embodiment of the present invention.

FIG. 7 is an explanatory diagram schematically showing the relationship between a travel section expected to be covered and a future travel section.

EMBODIMENTS FOR CARRYING OUT THE INVENTION

First Embodiment

Figure 2:
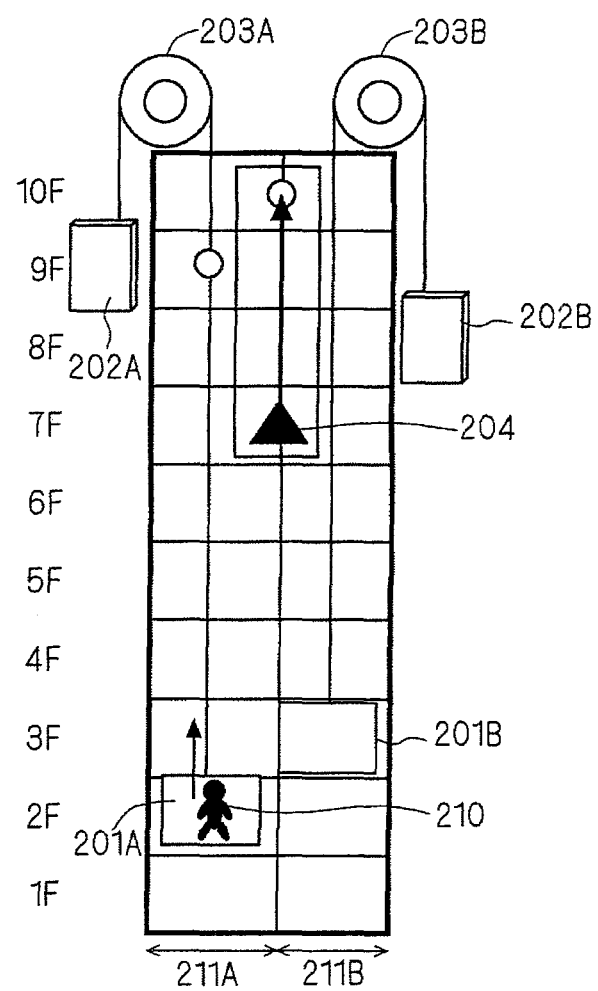
FIG. 2 is a diagram showing an example in which a function of the elevator group management system according to the first embodiment of the present invention is applied.

FIG. 1 is a block diagram showing the configuration of an elevator group management system according to a first embodiment of the present invention.

As shown in this figure, the elevator group management system includes an elevator group management system body 200, car-based control devices 1A to 1D, and hall call registration devices 2A to 2C.

The car-based control devices 1A to 1D control the operations of a car A to a car D (not shown) that respectively correspond thereto. The hall call registration devices 2A to 2C are typically provided in each floor and are capable of hall calls (for designating a destination floor or destination direction in a hall).

The car-based control devices 1A to 1D and the hall call registration devices 2A to 2C are connected to the elevator group management system body 200. The elevator group management system body 200 decides assigned cars for hall calls (combinations of a loading floor and a destination floor or combinations of a loading floor and a travel direction (destination direction)) registered by the hall call registration devices 2A to 2C, and collectively manages the travel of an elevator car group (car A to car D) through the car-based control devices 1A to 1D.

Next, an internal configuration of the elevator group management system body 200 will be specifically described. When a newly generated hall call is registered by any hall call registration device among the hall call registration devices 2A to 2C, the elevator group management system body 200 decides an assigned car corresponding to the newly registered hall call.

On this occasion, internal car-based assigned total evaluation index computing means 161 computes an assigned total evaluation index of each car before newly generated hall calls are assigned to each car (case 1) as well as an assigned total evaluation index of each car in a case where newly generated hall calls have been assigned to each car (case 2). Then, the car-based assigned total evaluation index computing means 161 outputs assigned total evaluation index information D161 that is the operational information described above to assigned car deciding means 171.

The assigned car deciding means 171 decides, as an assigned car, a car with the smallest increment of the assigned total evaluation index in the case after a newly generated hall call is assigned (case 2) with respect to that in the case before it is assigned (case 1), based on the assigned total evaluation index information D161.

With reference to FIG. 2 to FIG. 6, description is now given of the reason why not only the in-travel power consumption of a travel section by a known call that is expected to be covered but also the in-future-travel power consumption of a future travel-expected section by an unknown call needs to be taken into account.

As shown in FIG. 2, the state, in which a car 201A with one passenger 210 is traveling from the 2nd floor to the 9th floor in an up direction and a car 201B with "no" passenger is at a standstill on the 3rd floor, is assumed as a given state. Then, it is assumed that a new hall call 204 for loading on the 7th floor and unloading on the 10th floor is generated in the given state. Note that from the reason, for example, that an unloading floor is decided after loading into a car, it is assumed that what is determined by the new hall call 204 is unloading on the top floor, 10th floor also in the case where the loading floor is only the 7th floor.

Figure 3:
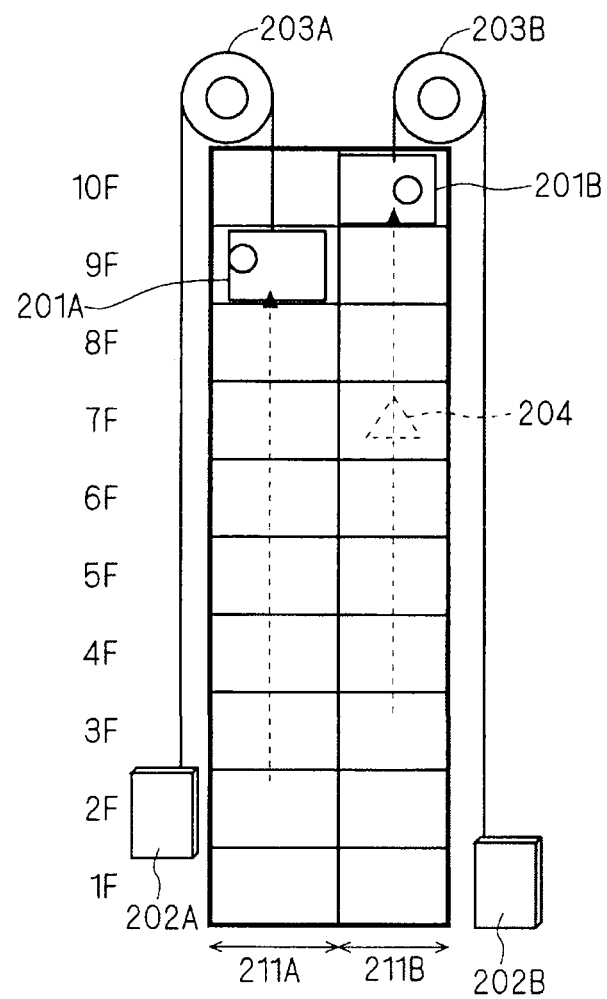
FIG. 3 is a diagram showing an example in which the function of the elevator group management system according to the first embodiment of the present invention is applied.

The case where the passenger by the new hall call 204 is assigned to the car 201B as shown in FIG. 3 is regarded as a case X. In the case X, an increase amount of the travel section to be covered by a known call corresponds to the regeneration-side travel from the 3rd floor to the 7th floor and the 7th floor to the 10th floor of the car 201B, and an increment of the in-travel power consumption of a travel section to be covered by a known call takes a negative value ($-\Delta X$($\Delta X$ is positive)).

This is because balance weights 202A and 202B provided at the ends opposite to the cars 201A and 201B through hoist machines 203A and 203B are typically set to the weights of the cars 201A and 201B, respectively, in a case of loading of approximately a half the capacity passenger and, in the given state, the car 201B with "no" passenger is lighter than the balance weight 202B. Therefore, travel of the car 201B in the up direction becomes a regeneration-side travel.

Figure 4:
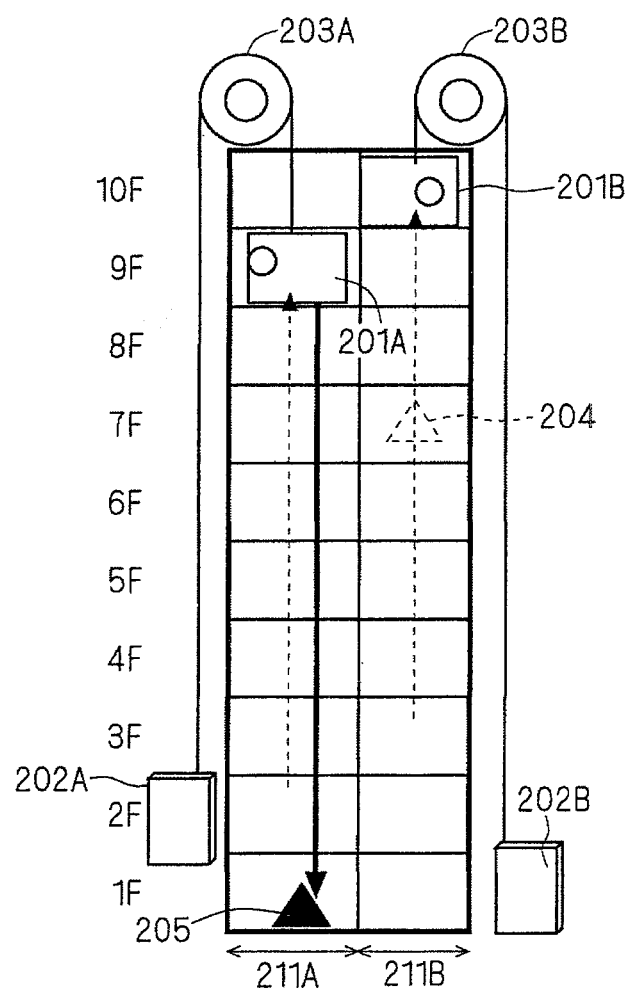
FIG. 4 is a diagram showing an example in which the function of the elevator group management system according to the first embodiment of the present invention is applied.

There is assumed a case, as shown in FIG. 4, where a future hall call 205 in the up direction with the 1st floor as the loading floor is generated after travel of FIG. 3 is all finished in employing the case X. In this case, the car 201A needs to travel from the 9th floor to the 1st floor. In this case, the travel of the car 201A from the 9th floor to the 1st floor becomes power-running-side travel, and an increment of power consumption takes a large value.

Figure 5:
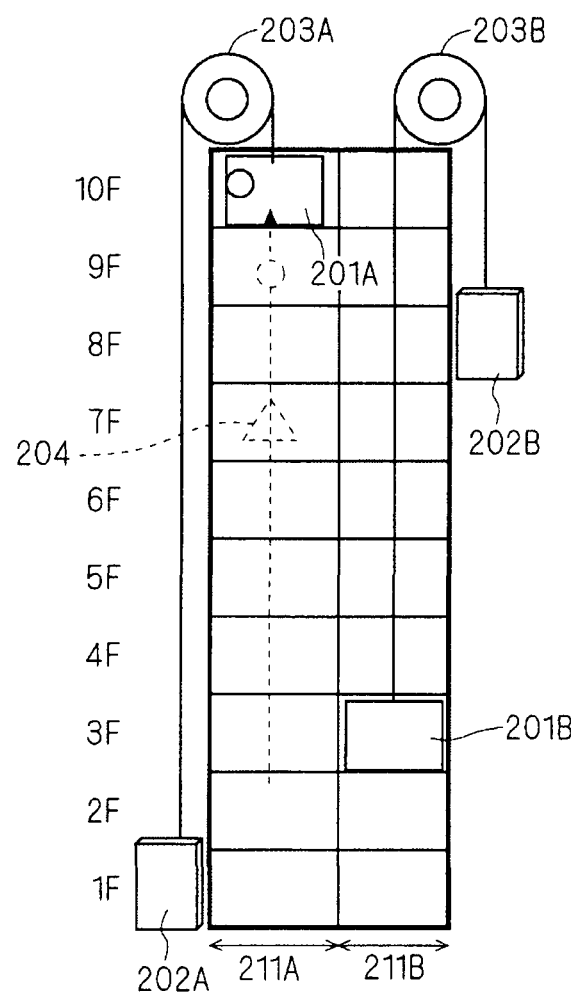
FIG. 5 is a diagram showing an example in which the function of the elevator group management system according to the first embodiment of the present invention is applied.

As shown in FIG. 5, the case where the new hall call 204 is assigned to the car 201A is assumed as a case Y. In the case Y, an increase amount of the travel section covered by a known call corresponds to regeneration-side travel of the car 201A from the 9th floor to the 10th floor, and an increment of in-travel power consumption of the travel section covered by a known call takes a negative value ($-\Delta Y$($\Delta Y$ is positive)).

In this case, $\Delta X > \Delta Y$. This is because the regeneration-side travel of the car 201B from the 3rd floor to the 7th floor and the 7th floor to the 10th floor increases in the case X, whereas in the case Y, only the regeneration-side travel of the car 201A from the 9th floor to the 10th floor increases. That is, compared with the case X, an increment of in-travel power consumption of the travel section covered by a known call takes a larger value in the case Y.

Figure 6:
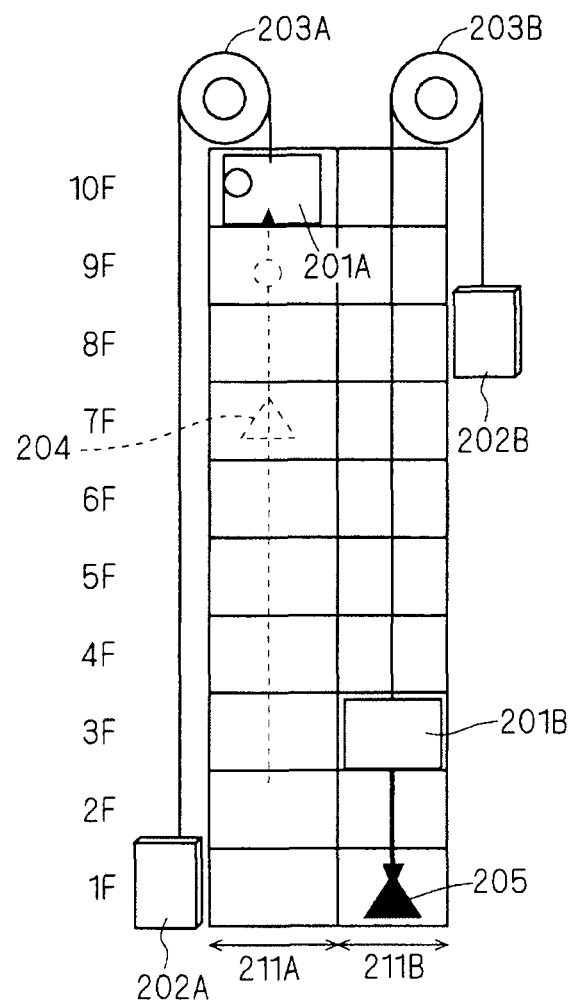
FIG. 6 is a diagram showing an example in which the function of the elevator group management system according to the first embodiment of the present invention is applied.

As shown in FIG. 6, in a case where the future hall call 205 in the up direction is generated from the 1st direction after the travel of FIG. 5 all ends in the case Y, the car 201B travels from the 3rd floor to the 1st floor, and an increment of power-running-side power consumption takes a smaller value compared with the case X.

That is, considering only the in-travel power consumption in the travel section covered by a known call, in many cases, an assignment is more likely to be made in the direction in which the regeneration-side travel increases in the travel section to be covered, such as the case X, but in a future travel section by an unknown call following the travel section to be covered, the travel section on the power running side actually increases correspondingly to the amount of travel on the regeneration side, leading to an increase in in-travel power consumption in total.

Therefore, in order to reduce power consumption according to an actual level, an assigned car needs to be decided by not only taking into account the in-travel power consumption in the travel section covered by a known call as in the case X but also taking into account the in-travel power consumption in the future travel section by an unknown call as in the case Y.

FIG. 7 is an explanatory diagram schematically showing the relationship between the travel section expected to be covered and the future travel section. In this figure, there is assumed a case where the same car 201 travels from the known present to the unknown future by division into first travel SC1, second travel SC2 and third travel SC3.

The car 201 is caused to travel while being stopped on stop-expected floors PF1 to PF3 that have already known in the first travel SC1, and then in the second travel SC2, is caused to travel from a new call floor NF1 to a last stop floor LF1 in response to the known new hall call 204.

For example, an unloading floor is decided after loading into a car, and thus the example of FIG. 7 shows the case where it is assumed that one determined by the new hall call 204 is only the new call floor NF1 that is a loading floor and unloading is made on the last stop floor LF1 that is the top floor.

In this case, the section in which the car 201 goes down from an initial position to the stop-expected floors PF1 to PF3 in the first travel SC1 and goes up from the stop-expected floor PF3 to the new call floor NH is a travel-expected section RZ1 that has been determined, and the section from the new call floor NF1 to the last stop floor LF1 in the second travel SC2 is a travel-expected section RZ2 that is assumed. Then, the travel section obtained by combining the travel-expected section Z1 that has been determined and the travel-expected section RZ1 that is assumed is the above-mentioned travel section expected to be covered. This known travel section expected to be covered is the section to be computed by an in-travel power consumption computing section 110 described below.

In the case X where an assignment is made to the car 201B in the example shown in FIG. 2 to FIG. 6 (case where an unloading floor by the new hall call 204 has not been decided), the section from the 3rd floor to the 7th floor is the travel-expected section RZ1 that has been determined, and the section from the 7th floor to the 10th floor is the travel-expected section RZ2 that is assumed. Then, the travel section RZ1+RZ2 is the travel section expected to be covered.

On the other hand, in the case Y where an assignment is made to the car 201A in the example shown in FIG. 2 to FIG. 6 (case where an unloading floor by the new hall call 204 has not been decided), the section in which the car 201A travels from the 1st floor to the 9th floor via the 7th floor is the travel-expected section RZ1 that has been determined, the section from the 9th floor to the 10th floor is the travel-expected section RZ2 that is assumed, and the travel section RZ1+RZ2 is the travel section expected to be covered.

On the other hand, what is assumed in the future third travel SC3 yet to be known is a future travel section RZ3. In the example of FIG. 7, the round-trip travel section from the last stop floor LF1 to the farthest terminal floor EF1 is the future travel section RZ3. This unknown future travel section is the section to be computed by an in-future-travel power consumption computing section 120 described below.

Next, specific description will be given of the contents of computation of the assigned total evaluation index by the car-based assigned total evaluation index computing means 161 in the elevator group management system body 200.

First, car-based number of between-stop-floors loading people estimating means 11 estimates the number of people loading between stop-expected floors of each car in both cases including the case 1 and the case 2.

Number of Between-Stop-Floors Boarding Passenger Estimation Method 11

Described below is an estimation example in the case of using the hall call registration devices 2A to 2C by an UPDN button (button for making a hall call in accordance with the travel direction in going up or down). It is estimated that there are three people loading at stop by an UP hall call on the lobby floor, one person loading at stop by a hall call other than the lobby and floor up direction, and one person unloading at stop by a car call (a destination floor is designated in the car). Further, assuming a value obtained by converting the current in-car load value measured with, for example, a given weighing device into the number of passengers as the number of people currently loading, the number of people loading between stop-expected floors of each car is estimated. Note that in principle, the timing at which the value obtained by converting the current in-car load value into the number of passengers is assumed as the number of people currently loading is the point at which a hall call or a car call is made, and it is possible to appropriately correct the number of people loading between the stop floors using the current in-car load value at this timing.

As described above, the car-based number of between-stop-floors loading people estimating means 11 is capable of estimating the number of passengers between stop floors more accurately by correcting the number of between-stop-floors loading people using the current in-car load value.

Further, in the case where the hall call registration devices 2A to 2C are capable of making hall destination floor calls (destination floors are designated in the hall), the number of between-stop-floors loading people may be estimated using the loading floor information, unloading floor information and number of people information that are obtained when hall destination floor calls are registered in the hall call registration devices 2A to 2C.

In this case, the car-based number of between-stop-floors loading people estimating means 11 is capable of increasing the accuracy of estimating the number of people expected to load between stop floors. This makes it possible to accurately compute a running power current value and a regenerative power value between stop floors by car-based running power computing means 21 and car-based regenerative power computing means 31 described below.

In this case, the number of between-stop-floors loading people that is obtained from the in-car load obtained with a given weighing device may be used as the number of passengers currently loading.

Further, as the number of people unloading at the stop floor due to a car call, a value obtained by dividing the number of passengers in a car by the number of stop floors by car calls. For example, in a case where ten people are estimated to be in a car and the car stops on five floors by car calls, it is assumed that two people unload at each floor by 10/5.

As described above, the car-based number of between-stop-floors loading people estimating means 11 estimates the number of between-stop-floors loading people of each car and outputs number of between-stop-floors loading people estimation information D11 being estimation results to car-based work load computing means 12 of the in-travel power consumption computing section 110.

The in-travel power consumption computing section 110 includes the car-based work load computing means 12, car-based loss computing means 13, car-based running power computing means 21 and car-based regenerative power computing means 31.

The car-based work load computing means 12 computes, based on the number of between-stop-floors loading people estimation information D11, in-travel work loads of each car in both cases including the cases before (case 1) and after (case 2) a newly generated hall call is assigned.

Specifically, the car-based work load computing means 12 computes work loads between stop floors where travel is expected using the in-car load obtained by converting the number of people, which is obtained from the number of between-stop-floors loading people estimation information D11, into weight, car weight, weight of a (balance) weight, length of an imbalanced rope between stop floors (length of an imbalanced portion of the rope that results from a difference between a car position and a weight position) and weight per rope unit length. Note that it is possible to obtain the weight of the imbalanced rope (weight of an imbalanced portion of the rope that results from a difference between a car position and a weight position) based on the length of the imbalanced rope and the weight per rope unit length.

Then, in the both cases, the car-based work load computing means 12 obtains values obtained by aggregation in units of cars for each power running and each regeneration, as an in-travel power running work load and an in-travel regeneration work load, respectively. Note that the in-travel regeneration work load takes a negative value.

The car-based work load computing means 12 outputs in-travel power running work load information D12A in which the in-travel power running work loads for each car in the both cases are specified to the car-based loss computing means 13 and the car-based running power computing means 21, and outputs in-travel regeneration work load information D12B in which the in-travel regeneration work loads for each car in the both cases are specified to the car-based loss computing means 13 and the car-based regenerative power computing means 31.

The car-based loss computing means 13 computes, based on the in-travel power running work load information D12A, the in-travel power running loss amounts when the in-travel power running work loads of each car in the both cases, which are obtained from the car-based work load computing means 12, are converted into values of running power. Then, the car-based loss computing means 13 outputs in-travel power running loss amount information D13A in which the computed in-travel power running loss amounts in the both cases are specified to the car-based running power computing means 21.

Further, the car-based loss computing means 13 computes in-travel regeneration loss amounts when the in-travel regeneration work loads in the both cases are converted into values of regenerative power, based on the in-travel regeneration work load information D12B. Then, the car-based loss computing means 13 outputs in-travel regeneration loss amount information D13B in which the computed in-travel regeneration loss amounts in the both cases to the car-based regenerative power computing means 31.

Note that the above-mentioned loss amounts include various types of losses such as a mechanical system loss, a hoist machine loss, losses at start-up and stop, and a loss in power conversion.

The car-based running power computing means 21 computes running power values of each car in the both cases based on the in-travel power running work load information D12A and the in-travel power running loss amount information D13A. For example, the running power value is obtained by adding the in-travel power running loss amount specified in the in-travel power running loss amount information D13A to the in-travel power running work load specified in the in-travel power running work load information D12A and converting the resultant into a power value. Note that the running power value computed by the car-based running power computing means 21 represents the running power value in the travel-expected section from the current position to the last stop position by a known call, which is expected to be covered by each car. To be expected to be covered represents all stop-expected floors of the loading floors or unloading floors specified by the known calls (loading calls or car calls), and the last stop represents that operations in response to all calls are finished.

Then, the car-based running power computing means 21 outputs running power value information D21 in which the computed running power values of each car are specified to car-based assigned total evaluation index computing means 161.

The car-based regenerative power computing means 31 computes regenerative power values of each car in the both cases based on the in-travel regeneration work load information D12B and the in-travel regeneration loss amount information D13B. The regenerative power value is, for example, obtained as a non-negative value obtained by subtracting an absolute value of the in-travel regeneration loss amount from an absolute value of the in-travel regeneration work load and converting the resultant into a power value. Alternatively, the regenerative power value may be multiplied by the conversion efficiency of regenerative power when the regenerative power is returned outside an elevator system such as a power system installed in a building. Still alternatively, in a case where there is an upper limit on a value of regenerative power capable of being returned outside the elevator system, the value of regenerative power may be modified to the upper limit value when the value of regenerative power becomes equal to or more than the upper limit value. Note that the value of regenerative power computed by the car-based regenerative power computing means 31 represents the value of regenerative power from the current position to the last stop position that is expected to be covered by each car.

Then, the car-based regenerative power computing means 31 outputs regenerative power value information D31 in which the computed regenerative power values of each car are specified to car-based assigned total evaluation index computing means 61.

The in-future-travel power consumption computing section 120 includes car-based future work load computing means 112, car-based future loss computing means 113, car-based future running power computing means 121 and car-based future regenerative power computing means 131.

The car-based future work load computing means 112 computes in-travel work loads in a future travel section by an unknown call after a last stop in the travel section to be covered by each car in both cases including the cases before (case 1) and after (case 2) a new hall call is assigned.

The future travel section by an unknown call after a last stop of each is set as one travel section or round-trip travel section from the last stop floor to the farthest terminal floor, or one travel section or round-trip travel section in which a sum of running power values becomes the largest in one-time travel from the last stop floor. Further, the number of people loading in the future travel section is appropriately set to the number of people, such zero or one.

The car-based future work load computing means 112, car-based future loss computing means 113, car-based future running power computing means 121 and car-based future regenerative power computing means 131 compute the running power value and regenerative power value similarly to the in-travel power consumption computing section 110.

The car-based future work load computing means 112 outputs in-future-travel power running work load information D112A to the car-based future loss computing means 113 and the car-based future regenerative power computing means 121 and outputs in-future-travel regeneration work load information D112B to the car-based future loss computing means 113 and the car-based future regenerative power computing means 131. The car-based future loss computing means 113 outputs in-future-travel power running loss amount information D113A to the car-based future running power computing means 121 and outputs in-future-travel regeneration loss amount information D113B to the car-based future regenerative power computing means 131.

The car-based future running power computing means 121 outputs future running power value information D121 in which the computed running power values of each car are specified to the car-based assigned total evaluation index computing means 161.

The car-based future regenerative power computing means 131 outputs future regenerative power value information D131 in which the computed regenerative power values of each car are specified to the car-based assigned total evaluation index computing means 161.

Waiting time evaluation index computing means 41 computes the estimated car arrival time at the stop floor by a hall call of each car in the both cases, and uses a square sum of the estimated car arrival time as the waiting time evaluation index. Equation (1) below shows a computing equation of a waiting time evaluation index W(i) of a car i (i is any one of A to D). Note that the target of the waiting time evaluation index W(i) is the above-mentioned travel-expected section of each car i.

[Math 1]

$$W(i) = \sum_{(f,d) \in H_i} (t_i(f, d))^2 \tag{1}$$

In Equation (1) above, (f, d) represents a combination of a floor f of the stop floor by a hall call and a travel direction d, Hi represents a set of stop floors of the car i by hall calls, and $t_i(f, d)$ represents the estimated arrival time of the car i at the floor f in the travel direction d. For example, the case of $t_A(5,$ up) means the estimated time at which the car A arrives at the 5th floor in an upward direction. In a case where the car A is expected to stop at the 5th floor and 7th floor in the upward direction and at the 3rd floor in a downward direction, a set of those is Hi.

Then, the waiting time evaluation index computing means 41 outputs waiting time evaluation index information D41 in which the waiting time evaluation index W(i) obtained by Equation (1) is specified to the car-based assigned total evaluation index computing means 161.

Car-based basic power computing means 51 computes basic power values of each car in the both cases. The basic power of each car represents the power consumption other than running power and regenerative power in travel, and for example, includes power consumption of in-car lighting, power consumption of an in-car fan, and power consumption of a control panel. In a case of a mode in which the in-car lighting and in-car fan come to rest when the car is at rest with no passenger loading, switches for in-car lighting and in-car fan are turned on upon a newly generated hall call being assigned, where an effect due to an increase in consumption amount of basic power is taken into account. Note that the basic power value computed by the car-based basic power computing means 51 represents a basic power value in a travel-expected section from the current position to the last stop position, which is expected to be covered by each car.

Then, the car-based basic power computing means 51 outputs basic power value information D51 in which the computed basic power value is specified to the car-based assigned total evaluation index computing means 161.

The car-based assigned total evaluation index computing means 161 computes assigned total evaluation indices of each car in the both cases including the case before and after a newly generated hall call is assigned (case 1 and case 2 described above) based on the running power value information D21, regenerative power value information D31, waiting time evaluation index information D41, future running power value information D121, future regenerative power value information D131 and basic power value information D51. The assigned total evaluation indices of each car are shown by Equation (2) and Equation (3).

[Math 2]

$$Vbef(i) = Wbef(i) + kN \cdot PNbef(i) + kF \cdot PFbef(i) + kZ \cdot PZbef(i) \quad (2)$$

[Math 3]

$$Vaft(i) = Waft(i) + kN \cdot PNaft(i) + kF \cdot PFaft(i) + kZ \cdot PZaft(i) \quad (3)$$

In Equation (2), Vbef(i) represents an assigned total evaluation index of the car in the case 1 before a newly generated hall call is assigned, Wbef(i) represents a waiting time evaluation index of the car i in the case 1, PNbef(i) represents an in-travel power consumption value of the car i in the case 1, PFbef(i) represents an in-future-travel power consumption value of the car i in the case 1, and PZbef(i) represents a basic power value of the car i in the case 1.

In Equation (3), Vaft(i) represents an assigned total evaluation index of the car i in the case 2 in a case after a newly generated hall call is assigned to the car i, Waft(i) represents a waiting time evaluation index of the car i in the case 2, PNaft(i) represents an in-travel power consumption value of the car i in the case 2, PFaft(i) represents an in-future-travel power consumption value of the car i in the case 2, and PZaft(i) represents a basic power value of the car i in the case 2. The in-travel power consumption PNbef(i) and PNaft(i) of the right sides of Equation (2) and Equation (3) takes a value obtained by subtracting the regenerative power value information D31 from the running power value information D21 of the car i, and the in-future-travel power consumption PFbef(i) and PFaft(i) of the right sides of Equation (2) and Equation (3) takes a value obtained by subtracting the future regenerative power value information D131 from the future running power value information D121 of the car i.

The respective values (indices) of the right sides of Equation (2) and Equation (3) are obtained from the waiting time evaluation index information D41, running power value information D21, regenerative power value information D31, basic power value information D51, future running power value information D121 and future regenerative power value information D131.

Then, in Equation (2) and Equation (3), kN is a positive weighting coefficient of the in-travel power consumption value, kF is a positive weighting coefficient of the in-future-travel power consumption value, and kZ is a weighting coefficient of the basic power value. Used as those coefficients are weighting coefficients set in advance and weighting coefficients decided to appropriate values according to building specifications such as the number of floors and the number, speed and capacity of a car. Further, the respective weighting coefficients may be changed to appropriate values in a dynamic manner, according to the number of passengers, floor on which passengers appear, and direction in which passengers appear per unit time in each time period.

The weighting coefficients (kN, kF, kZ) may be provided to the car-based assigned total evaluation index computing means 161 by weighting coefficient computing means (not shown in FIG. 1) that decides a running power weighting coefficient using at least one parameter among the parameters indicating a current traffic flow index, elevator specifications, building specifications and an elevator control state and outputs the weighting coefficients. Note that the current traffic flow index represents, for example, the number of passengers on each floor in each travel direction for last five minutes, the number of passengers appearing on each floor in each direction for immediately following five minutes that is obtained from the estimation, the occurrence rate of passengers who move from the lobby floor to the upper floors with respect to the entire passengers for the last five minutes or immediately following five minutes, and the occurrence rate of passengers who move from the upper floors to the lobby floor with respect to the entire passengers for the last five minutes or immediately following five minutes.

The elevator group management system according to the first embodiment uses a weighting coefficient of an in-travel power consumption value, a weighting coefficient of an in-future-travel power consumption value, and a weighting coefficient of a basic power value (kN, kF and kZ) for the assigned total evaluation index before assignment Vbef(i) and the assigned total evaluation index after assignment Vaft(i), and accordingly is capable of computing assigned total evaluation indices before and after the assignment in which an occurring traffic flow, elevator specifications and building specifications are reflected.

Further, the car-based number of between-stop-floors loading people estimating means 11 that estimates the number of between-stop-floors loading people of each car, and thus it is possible to accurately compute a work load between stop floors.

Then, the car-based assigned total evaluation index computing means 161 outputs, to the assigned car deciding means 171, the assigned total evaluation index information D161 in which the assigned total evaluation index before assignment Vbef(i) and the assigned total evaluation index after assignment Vaft(i) of each car in the case 1 and the case 2, which are obtained by Equation (2) and Equation (3) described above, are specified.

The assigned car deciding means 171 decides, as an assigned car, a car with the smallest difference obtained by subtracting the assigned total evaluation index before assignment Vbef(i) in the case 1 before a newly generated hall call is assigned from the assigned total evaluation index after assignment Vaft(i) in the case 2 after a newly generated hall call is assigned. That is, the car i with the smallest value shown by Equation (4) below is designated as the assigned car C.

[Math 4]

$$C = \min(Vaft(i) - Vbef(i)) \quad (4)$$

As described above, Vaft(i) and Vbef(i) are the assigned total evaluation indices of the car i after (case 2 above) and before (case 1 above) a newly generated hall call is assigned.

Though the waiting time evaluation index W(i) is taken as the square sum of the estimated arrival time at the stop floor by a hall call as shown in Equation (1), other function may be used, which has a slope increasing along with an increase in estimated arrival time, such as a sum of 1.5th power value of the estimated arrival time.

In Equation (2) and Equation (3), the in-travel power consumption value is regarded as a value obtained by subtracting the (regenerative power value specified in) regenerative power value information from the (running power value specified in) running power value information, and the infuture-travel power consumption value is regarded as a value obtained by subtracting the (regenerative power value specified in) future regenerative power value information from the (future running power value specified in) future running power value information. Alternatively, the regenerative power value and the future regenerative power value may be multiplied by a discount coefficient in which the regenerative efficiency is taken into account. In a case where the regenerative power is not used because of conditions of buildings or the like, the regenerative power value and future regenerative power value may be always set to "0". Still alternatively, in order to enhance the effects of in-future-travel power consumption in power running of Equation (2) and Equation (3), only the future regenerative power value may be always set to "0".

While the basic power value is included in the computing equation of assigned evaluation index, the basic power value may be omitted from the computing equation of assigned evaluation index.

Other than the indices shown in Equation (2) and Equation (3), the value obtained by multiplying the other index such as the probability of occurrence of full occupancy by a weighting coefficient may be added in the computing equation of assigned evaluation index.

Though the assigned evaluation index is obtained as a linear sum of various evaluation indices in Equation (2) and Equation (3), it may be obtained using other functional form such as square sums of various evaluation indices.

The amount of $CO_2$ emissions in power running may be used in place of running power value, and the amount of $CO_2$ emissions in regeneration may be used in place of the regenerative power value. In general, the amounts of $CO_2$ emissions in power running and regeneration are ones obtained by multiplying a running power value and a regenerative power value by the coefficient depending on an electric power company from which a building purchases electric power. That is, the amount of $CO_2$ emissions is used as a value substantially equivalent to the running power value and regenerative power value.

Also after an assigned car is decided in response to a new hall call, the computation as to whether the assigned car by the hall call in which an assigned car has been assigned can be changed periodically with the use of the assigned total evaluation index. The assignment by a hall call in which an assigned car has been decided is provisionally erased, and the assigned total evaluation indices of each car in the cases before and after assignment is performed assuming that the provisionally erased hall call has been generated are computed, whereby a car with a small increment of assigned total evaluation index in the case where assignment has been performed is designated as an assigned car after assignment review. In this case, the car after assignment review may be the originally assigned car.

Figure 8:
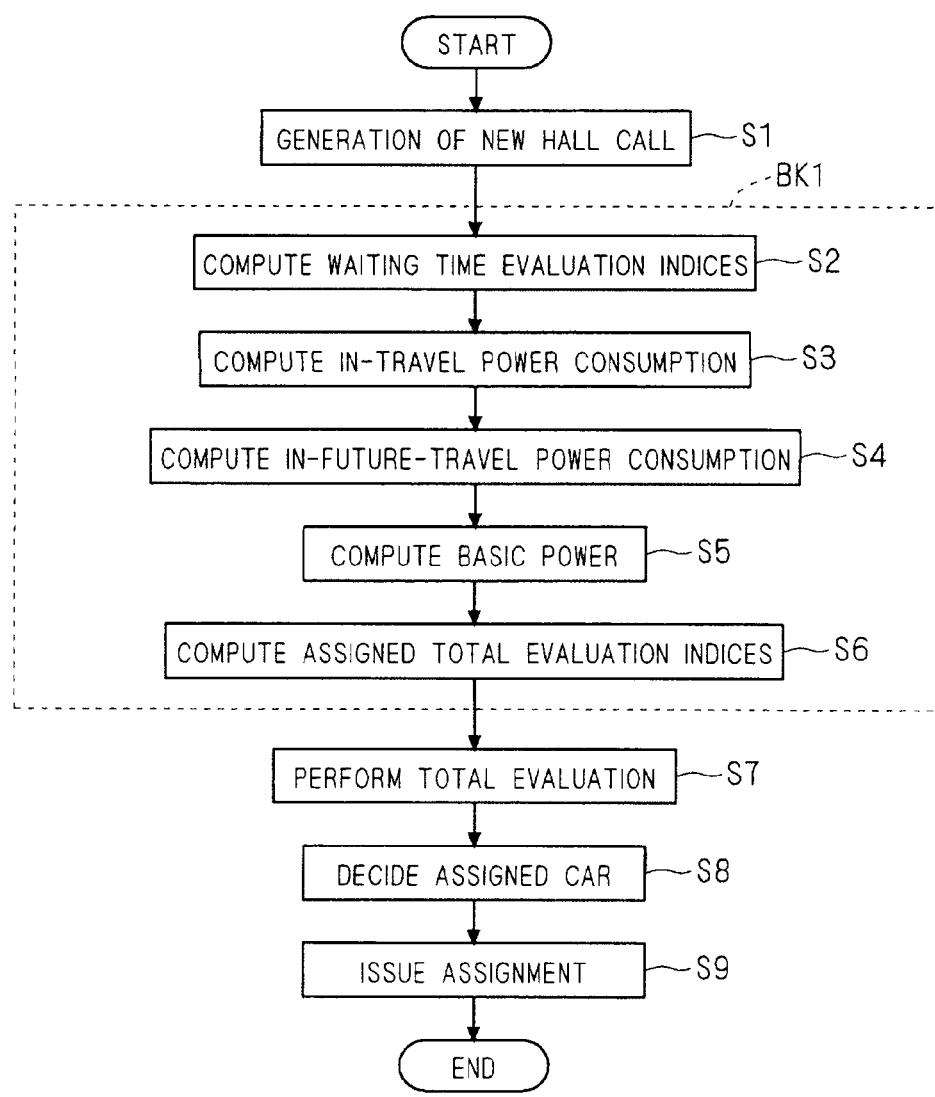
FIG. 8 is a flowchart showing a processing procedure of a method of deciding an assigned car by the elevator group management system according to the first embodiment of the present invention.

FIG. 8 is a flowchart showing a processing procedure of the method of deciding an assigned car by the elevator group management system according to the first embodiment of the present invention. Hereinafter, the method of deciding an assigned car will be descried with reference to this figure.

First, in Step S1, when a hall call is newly generated from any of the hall call registration devices 2A to 2C, the elevator group management system body 200 receives the contents of this hall call. The contents of the hall call are all managed by, for example, a management section (not shown) of the elevator group management system body 200.

Then, in Step S2, waiting time evaluation indices W(i) in the cases before (case 1 above) and after (case 2 above) a newly generated hall call is assigned to each car i are computed.

After that, in Step S3, in-travel power consumption of each car i is computed. That is, as described above, the in-travel power consumption computing section 110 computes the in-travel running power value and in-travel regenerative power value of each car i in the case 1 and the case 2.

Then, in Step S4, in-future-travel power consumption of each car i is computed. That is, as described above, the in-future-travel power consumption computing section 120 computes the running power value and regenerative power value in the respective future travel sections of each car i in the case 1 and the case 2.

Then, in Step S5, as described above, the car-based basic power computing means 51 computes the basic power values of each car i in the case 1 and the case 2.

After that, in Step S6, as described above, the car-based assigned total evaluation index computing means 161 computes the assigned total evaluation index before assignment Vbef(i) and the assigned total evaluation index after assignment Vaft(i) by new hall calls of each car i in the case 1 and the case 2.

The computing of Step S2 to Step S6 described above is shown as a repetition block BK1 that is performed for all cars in the case 1 and the case 2 per newly generated hall call.

After computing of the repetition block BK1 is performed on all cars, in Step S7, as described above, the car-based assigned total evaluation index computing means 161 performs total evaluation using an increment value of the assigned total evaluation index represented by Equation (4).

Then, in Step S8, the assigned car deciding means 171 decides an assigned car as described above.

Finally, in Step S9, an assignment is issued to the control device corresponding to the assigned car decided in Step S8 among the car-based control devices 1A to 1D, to thereby control an elevator car.

The elevator group management system according to the first embodiment that has the above-mentioned configuration decides an assigned car with the use of the assigned total evaluation index that has the waiting time evaluation index, in-travel power consumption value, and in-future-travel power consumption value as indices, and accordingly is capable of evaluating an increment of power consumption value not only including a travel section by a known call to be covered but also including a future travel section by a subsequent unknown call. This enables the elevator group management system to considerably exert the effect of saving energy without deteriorating the waiting time to a large extent.

That is, the assigned car deciding section composed of the car-based assigned total evaluation index computing means 161 and the assigned car deciding means 171 of the elevator group management system according to the first embodiment decides an assigned car, in response to a newly generated hall car, based on the in-travel power consumption value and the in-future-travel power consumption value. This makes it possible to totally evaluate the power consumption not only including a travel section by a known call but also including a future travel section by an unknown call, and there is obtained an effect that energy is saved without deteriorating the waiting time to a large extent.

In this case, by setting the future travel-expected section as one travel section or round-trip travel section from the last stop floor to the farthest terminal floor, or one travel section or round-trip travel section in which a sum of running power values by one-time travel from the last stop floor becomes largest, it is possible to perform the assigned car decision processing in which the worst case is assumed as to an increase in future running power value.

Further, in both functions of the assigned total evaluation index before assignment Vbef(i) and the assigned total evaluation index after assignment Vaft(i), a square sum of the estimated arrival time is applied to the waiting time evaluation index, and a linear sum is applied to the in-travel power consumption value and the in-future-travel power consumption value. That is, a rate of an increase in slope of a function of waiting time evaluation index (for example, degree of function) is set to be larger than a rate of increase in slope of functions of in-travel power consumption value information and in-future-travel power consumption value information.

Accordingly, during off-peak times when there are a few passengers and the estimated arrival time is short, the in-travel power consumption value and the in-future-travel power consumption value largely affect the assigned total evaluation index, whereas the waiting time evaluation index largely affects the assigned total evaluation index during peak times when many passengers appear and the estimated arrival time is long. Therefore, it is possible to decide an assigned car with a balance between the waiting time of passengers and energy saving in accordance with the degree at which a car becomes crowded with passengers such that during off-peak times with short waiting time, energy is saved while permitting the deterioration of waiting time to some extent, and that during peak times with long waiting time, energy is saved to some extent while hardly deteriorating the waiting time. This effect is achieved, to one degree or another, by setting the rate of an increase in slope of a function of the waiting time evaluation index to be larger than the rates of an increase in slope of at least one function of the in-travel power consumption value information and the in-future-travel power consumption value information.

Further, various losses of an elevator system other than a work load are reflected by the car-based loss computing means 13 and the car-based future loss computing means 113, which makes it possible to compute a running power value and a regenerative power value more accurately.

That is, the elevator group management system according to the first embodiment takes into account the in-travel power running loss amount information D13A and in-travel regeneration loss amount information D13B from the car-based loss computing means 13 and the in-future-travel power running loss amount information D113A and in-future-travel regeneration loss amount information D113B from the car-based future loss computing means 113. Accordingly, the car-based running power computing means 21, car-based regenerative power computing means 31, car-based future running power computing means 121 and car-based future regenerative power computing means 131 achieve the effect of enabling more accurate computation of power consumption values (running power value and regenerative power value).

Further, the car-based basic power computing means 51 also obtains the basic power value, and thus it is possible to evaluate not only the in-travel power consumption but also the basic power used in in-car lighting, an in-car air conditioner and a control panel.

That is, the elevator group management system according to the first embodiment is capable of computing the assigned total evaluation index before assignment Vbef(i) and the assigned total evaluation index after assignment Vaft(i) by the car-based assigned total evaluation index computing means 161, based on the basic power value information D51, by taking more into account the power consumption of in-car lighting, air conditioner and the like that are typically turned off when a car is at rest. Accordingly, it is possible to decide an assigned car based on the more accurate power consumption value.

In addition, different regenerative efficiency and regenerative power upper limit are reflected for each building, whereby it is possible to accurately compute the regenerative power available in the outside.

Further, there is provided the car-based number of between-stop-floors loading people estimating means 11 that estimates the number of between-stop-floors loading people of each car, which makes it possible to accurately compute a work load between stop floors.

That is, the elevator group management system according to the first embodiment is capable of estimating the expected number of between-stop-floors loading people based on the number of between-stop-floors loading people estimation information D11 from the car-based number of between-stop-floors loading people estimating means 11. Therefore, the car-based work load computing means 12 is capable of accurately computing an in-travel power running work load and an in-travel regeneration work load based on the number of between-stop-floors loading people estimation information D11. This makes it possible to accurately compute the running power value and regenerative power value by the car-based running power computing means 21 and the car-based regenerative power computing means 31.

Moreover, an amount of $CO_2$ emissions is applicable in place of a power value, and accordingly it is possible to save energy according to a demand of the owner of a building.

Second Embodiment

Figure 9:
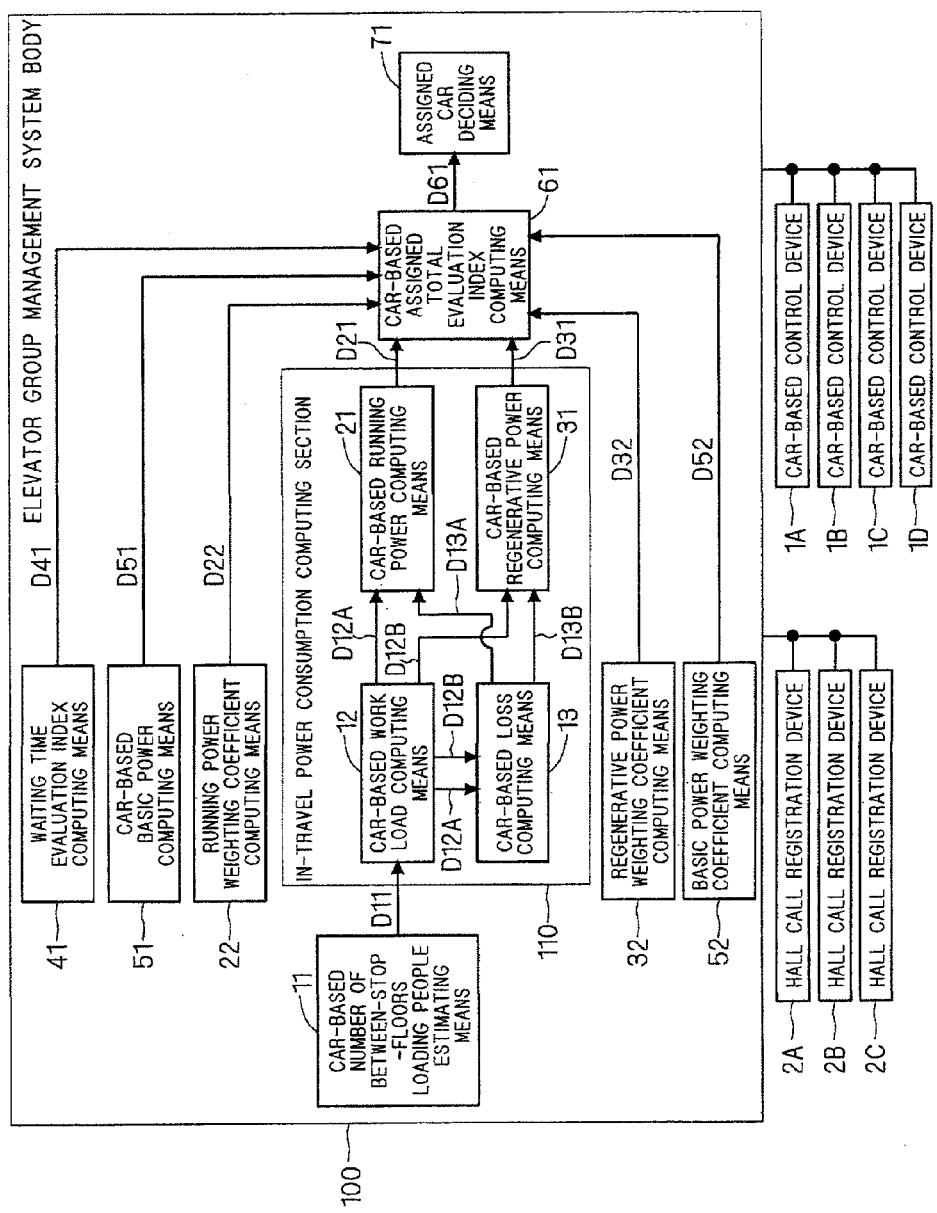
FIG. 9 is a block diagram showing a configuration of an elevator group management system according to a second embodiment of the present invention.

FIG. 9 is a block diagram showing the configuration of an elevator group management system according to a second embodiment of the present invention.

As shown in this figure, the elevator group management system includes an elevator group management system body 100, car-based control devices 1A to 1D and hall call registration devices 2A to 2C.

The car-based control devices 1A to 1D control the operations of a car A to a car D (not shown) that respectively correspond thereto. The hall call registration devices 2A to 2C are typically provided in respective floors and are capable of hall calls (for designating a destination floor or destination floor in a hall).

The car-based control devices 1A to 1D and the hall call registration devices 2A to 2C are connected to the elevator group management system body 100. The elevator group management system body 100 decides an assigned car for hall calls (combination of a loading floor and a destination floor or combinations of a loading floor and a travel direction (destination direction)) registered by the hall call registration devices 2A to 2C, and collectively manages the travel of an elevator car group (car A to car D) through the car-based control devices 1A to 1D.

Next, the internal configuration of the elevator group management system body 100 will be specifically described. When a newly generated hall call is registered by any hall call registration device among the hall call registration devices 2A to 2C, the elevator group management system body 100 decides an assigned car corresponding to the newly registered hall call.

On this occasion, internal car-based assigned total evaluation index computing means 61 computes an assigned total evaluation index of each car before newly generated hall call is assigned to each car (case 1) as well as an assigned total evaluation index of the each car in a case where newly generated hall call is assigned to each car (case 2). Then, the car-based assigned total evaluation index computing means 61 outputs assigned total evaluation index information D61 that is the operational information described above to the assigned car deciding means 71.

The assigned car deciding means 71 decides, as an assigned car, a car with the smallest increment of the assigned total evaluation index in the case where a newly generated hall call is assigned (case 2) with respect to the that before it is not assigned (case 1), based on the assigned total evaluation index information D61.

Next, specific description will be given of the contents of computing the assigned total evaluation index by the car-based assigned total evaluation index computing means 61 in the elevator group management system body 100.

First, car-based number of between-stop-floors loading people estimating means 11 estimates the number of people loading between stop-expected floors of each car in both cases including the case 1 and the case 2.

Described below is an estimation example in the case of using the hall call registration devices 2A to 2C by an UPDN button (button for making a hall call in accordance with the travel direction in going up or down). It is estimated that there are three people loading at stop by an UP hall call on the lobby floor, one person loading at stop by a hall call other than the lobby floor in an up direction, and one person unloading at stop by a car call (a destination floor is designated in the car). Further, assuming a value obtained by converting the current in-car load value measured with, for example, a given weighing device into the number of passengers as the number of people currently loading, the number of people loading between stop-expected floors of each car is estimated. Note that in principle, the timing at which the value obtained by converting the current in-car load value into the number of passengers is assumed as the number of people currently loading is the point at which a hall call or a car call is made, and it is possible to appropriately correct the number of people loading between the stop floors using the current in-car load value at this timing.

As described above, the car-based number of between-stop-floors loading people estimating means 11 is capable of estimating the number of people between stop floors more accurately by correcting the number of between-stop-floors loading people using the current in-car load value.

Further, in the case where the hall call registration devices 2A to 2C are capable of making hall destination floor calls (destination floors are designated in the hall), the number of between-stop-floors loading people may be estimated using the loading floor information, unloading floor information and number of people information that are obtained when hall destination floor calls are registered in the hall call registration devices 2A to 2C.

In this case, the car-based number of between-stop-floors loading people estimating means 11 is capable of increasing the accuracy of estimating the number of people expected to load between stop floors. This makes it possible to accurately compute a running power value and a regenerative power value between stop floors by car-based running power computing means 21 and car-based regenerative power computing means 31.

In this case, the number of people loading between stops that is obtained from the in-car load obtained with a given weighing device may be used as the number of passengers currently loading.

Further, as the number of people unloading at the stop floor by car calls, a value obtained by dividing the number of passengers in a car by the number of stop floors by car calls. For example, in a case where ten people are estimated to be in a car and the car stops at five floors by car calls, it is assumed that two people unload at each floor by 10/5.

As described above, the car-based number of between-stop-floors loading people estimating means 11 estimates the number of between-stop-floors loading people of each car and outputs number of between-stop-floors loading people estimation information D11 being estimation results to the car-based work load computing means 12 of the in-travel power consumption computing section 110.

The in-travel power consumption computing section 110 includes the car-based work load computing means 12, car-based loss computing means 13, car-based running power computing means 21 and car-based regenerative power computing means 31.

The car-based work load computing means 12 computes, based on the number of between-stop-floors loading people estimation information D11, in-travel work loads of each car in both cases including the cases before (case 1) and after (case 2) a newly generated hall call is assigned.

Specifically, the car-based work load computing means 12 computes work loads between stop floors where travel is expected using the in-car load obtained by converting the number of loading people into weight, which is obtained from the number of between-stop-floors loading people estimation information D11, car weight, weight of a (balance) weight, length of an imbalanced rope between stop floors (length of an imbalanced portion of the rope that results from a difference between a car position and a weight position) and weight per rope unit length. Note that it is possible to obtain the weight of the imbalanced rope (weight of an imbalanced portion of the rope that results from a difference between a car position and a weight position) based on the length of the imbalanced rope and the weight per rope unit length.

Then, in the both cases, the car-based work load computing means 12 obtains values obtained by aggregation in units of cars for each power running and each regeneration as an in-travel power running work load and an in-travel regeneration work load, respectively. Note that the in-travel regeneration work load takes a negative value.

The car-based work load computing means 12 outputs in-travel power running work load information D12A in which the in-travel power running work loads in the both cases for each car are specified to the car-based loss computing means 13 and the car-based running power computing means 21, and outputs in-travel regeneration work load information D12B in which the in-travel regeneration work loads in the both cases for each car are specified to the car-based loss computing means 13 and the car-based regenerative power computing means 31.

The car-based loss computing means 13 computes, based on the in-travel power running work load information D12A, in-travel power running loss amounts when in-travel power running work loads of each car in the both cases, which are obtained from the car-based work load computing means 12, are converted into values of running power. Then, the car-based loss computing means 13 outputs in-travel power running loss amount information D13A in which the computed in-travel power running loss amounts in the both cases are specified to the car-based running power computing means 21.

Further, the car-based loss computing means 13 computes in-travel regeneration loss amounts when the in-travel regeneration work loads in the both cases are converted into values of regenerative power, based on in-travel regeneration work load information D12B. Then, the car-based loss computing means 13 outputs in-travel regeneration loss amount information D13B in which the computed in-travel regeneration loss amounts in the both cases are specified to the car-based regenerative power computing means 31.

Note that the above-mentioned loss amounts include various types of losses such as a mechanical system loss, a hoist machine loss, losses at start-up and stop, and a loss in power conversion.

The car-based running power computing means 21 computes running power values of each car in the both cases based on the in-travel power running work load information D12A and the in-travel power running loss amount information D13A. For example, the running power value is obtained by adding the in-travel power running loss amount specified in the in-travel power running loss amount information D13A to the in-travel power running work load specified in the in-travel power running work load information D12A and converting the resultant into a power value. Note that the running power value computed by the car-based running power computing means 21 represents the running power value in the travel-expected section from the current position to the last stop position by a known call, which is expected to be covered by each car. To be expected to be covered represents all stop-expected floors of the loading floors or unloading floors specified by the known calls (loading calls or car calls), and the last stop represents that operations in response to all calls are finished.

Then, the car-based running power computing means 21 outputs running power value information D21 in which the computed running power value of each car to car-based assigned total evaluation index computing means 161.

The car-based regenerative power computing means 31 computes regenerative power values of each car in the both cases based on the in-travel regeneration work load information D12B and the in-travel regeneration loss amount information D13B. The regenerative power value is, for example, obtained as a non-negative value obtained by subtracting an absolute value of an in-travel regeneration loss amount from an absolute value of the in-travel regeneration work load and converting the resultant into a power value. Alternatively, the regenerative power value may be multiplied by the conversion efficiency of regenerative power when the regenerative power is returned outside an elevator system such as a power system installed in a building. Still alternatively, in a case where there is an upper limit on a value of regenerative power capable of being returned outside the elevator system, the value of regenerative power may be modified to the upper limit value in a case where the value of regenerative power becomes equal to or more than the upper limit value. Note that the regenerative power value computed by the car-based regenerative power computing means 31 represents the value of regenerative power from a current position to the last stop position that is expected to be covered by each car.

Then, the car-based regenerative power computing means 31 outputs regenerative power value information D31 in which the computed regenerative power values of each car are specified to the car-based assigned total evaluation index computing means 61.

The running power weighting coefficient computing means 22 decides a running power weighting coefficient using at least one parameter among the parameters indicating the current traffic flow index, elevator specifications, building specifications and an elevator control state. The current traffic flow index represents, for example, the number of passengers appearing for the last five minutes per floor and per travel direction, the number of passengers appearing for the immediately following five minutes per floor and per direction that is obtained from the estimation, the occurrence rate of the passengers moving from the lobby floor to the upper floors for the last five minutes or immediately following five minutes to the all passengers, and the occurrence rate of the passengers moving from the upper floors to the lobby floor for the last five minutes or immediately following five minutes to the all passengers. The elevator specifications represent, for example, rated speed, acceleration, the number of cars, car capacity, and the time for door opening and closing. The building specifications represent, for example, the number of floors, floor height, and distance of an express zone (distance in a case of non-stop operation between floors distant from each other with floors therebetween skipped, such as non-stop operation from 1st floor to 21st floor). The elevator control state represents, for example, the state where an operation mode such as an operation mode at the start of office hours is applicable or not.

Then, the running power weighting coefficient computing means 22 outputs running power weighting coefficient information D22 in which the decided running power weighting coefficient is specified to the car-based assigned total evaluation index computing means 61.

Regenerative power weighting coefficient computing means 32 decides a regenerative power weighting coefficient using at least one parameter among the above-mentioned parameters indicating the current traffic flow index, elevator specifications, building specifications and an elevator control state.

Then, the regenerative power weighting coefficient computing means 32 outputs regenerative power weighting coefficient information D32 in which the decided regenerative power weighting coefficient is specified to the car-based assigned total evaluation index computing means 61.

The waiting time evaluation index computing means 41 computes the estimated car arrival time at the stop floor by a hall call of each car in the both cases, and uses a square sum of the estimated car arrival time as the waiting time evaluation index. Equation (5) below shows the computing equation of the waiting time evaluation index W(i) of a car i (i is any one of A to D). Note that the target of the waiting time evaluation index W(i) is the above-mentioned travel-expected section of each car i.

[Math 5]

$$W(i) = \sum_{(f,d) \in H_i} (t_i(f, d))^2 \qquad (5)$$

In Equation (5) above, (f, d) represents a combination of a floor f of the stop floor by a hall call and a travel direction d, Hi represents a set of stop floors of the car i by hall calls, and $t_i(f, d)$ represents the estimated arrival time of the car i, at the floor f in the travel direction d. For example, the case of $t_A(5, \text{up})$ means the estimated time at which the car A arrives at the 5th floor in an upward direction. In a case where the car A is expected to stop at the 5th floor and 7th floor in the upward direction and at the 3rd floor in a downward direction, a set of those is Hi.

Then, the waiting time evaluation index computing means 41 outputs the waiting time evaluation index information D41 in which the waiting time evaluation index W(i) obtained by Equation (5) is specified to the car-based assigned total evaluation index computing means 161.

The car-based basic power computing means 51 computes basic power values of each car in the both cases. The basic power of each car represents the power consumption other than running power and regenerative power in travel, and for example, includes power consumption of in-car lighting, power consumption of an in-car fan, and power consumption of a control panel. In a case of a mode in which the in-car lighting and in-car fan come to rest when the car is at rest with no passenger loading, switches for in-car lighting and in-car fan are turned on upon a newly generated hall call being assigned, where an effect due to an increase in consumption amount of basic power is taken into account. Note that the basic power value computed by the car-based basic power computing means 51 represents a basic power value in a travel-expected section from the current position to the last stop position, which is expected to be covered by each car.

Then, the car-based basic power computing means 51 outputs basic power value information D51 in which the computed basic power value is specified to the car-based assigned total evaluation index computing means 61.

Basic power weighting coefficient computing means 52 decides a basic power weighting coefficient corresponding to the basic power specified in the basic power value information D51, based on the elevator specifications and the like.

Then, the basic power weighting coefficient computing means 52 outputs basic power weighting coefficient information D52 in which the decided basic power weighting coefficient is specified to the car-based assigned total evaluation index computing means 61.

The car-based assigned total evaluation index computing means 61 computes assigned total evaluation indices of each car in the both cases including the cases before and after a newly generated hall call is assigned (case 1 and case 2 above) based on the running power value information D21, the running power weighting coefficient information D22, the regenerative power value information D31, the regenerative power weighting coefficient information D32, the waiting time evaluation index information D41 and the basic power value information D51. The assigned total evaluation indices of each car are expressed by Equation (6) and Equation (7).

[Math 6]

$$Vbef(i)=Wbef(i)+kA \cdot PAbef(i)+kB \cdot PBbef(i)+kZ \cdot PZbef(i) \qquad (6)$$

[Math 7]

$$Vaft(i)=Waft(i)+kA \cdot PAaft(i)+kB \cdot PBaft(i)+kZ \cdot PZaft(i) \qquad (7)$$

In Equation (6), Vbef(i) represents an assigned total evaluation index of the car in the case 1 before a newly generated hall call is assigned, Wbef(i) represents a waiting time evaluation index of the car i in the case 1, PAbef(i) represents a running power value of the car i in the case 1, which is non-negative, PBbef(i) represents a regenerative power value of the car i in the case 1, which is non-negative, and PZbef(i) represents a basic power value of the car i in the case 1, which is non-negative.

In Equation (7), Vaft(i) represents an assigned total evaluation index of the car i in the case 2 after a newly generated hall call is assigned to the car i, Waft(i) represents a waiting time evaluation index of the car i in the case 2, PAaft(i) represents a running power value of the car i in the case 2, which is non-negative, PBaft(i) represents a regenerative power value of the car i in the case 2, which is non-negative, and PZaft(i) represents a basic power value of the car i in the case 2. The respective values (indices) of the right sides of Equation (6) and Equation (7) are obtained from the waiting time evaluation index information D41, running power value information D21, regenerative power value information D31 and basic power value information D51.

Then, in Equation (6) and Equation (7), kA is a positive weighting coefficient of the running power value, kB is a positive weighting coefficient of the regenerative power value, and kZ represents a weighting coefficient of the basic power value, which is non-negative. Those coefficients can be obtained from the running power weighting coefficient information D22, regenerative power weighting coefficient information D32 and basic power weighting coefficient information D52.

Then, the car-based assigned total evaluation index computing means 61 outputs, to the assigned car deciding means 171, the assigned total evaluation index information D61 in which the assigned total evaluation index before assignment Vbef(i) and assigned total evaluation index after assignment Vaft(i) of each car i in the case 1 and the case 2, which are obtained by Equation (6) and Equation (7) described above, are specified.

The assigned car deciding means 71 decides, as an assigned car, a car with the smallest difference obtained by subtracting the assigned total evaluation index before assignment Vbef(i) in the case 1 before a newly generated hall call is assigned from the assigned total evaluation index after assignment Vaft(i) in the case 2 after a newly generated hall call is assigned. That is, the car i with the smallest value shown by Equation (8) is regarded as the assigned car C.

[Math 8]

$$C=\min(Vaft(i)-Vbef(i)) \qquad (8)$$

As described above, Vaft(i) and Vbef(i) are the assigned total evaluation indices of the car i after (case 2 above) and before (case 1 above) a newly generated hall call is assigned.

Though the waiting time evaluation index W(i) is taken as the square sum of the estimated arrival time at the stop floor by a hall call as shown in Equation (5), other function may be used, which has a slope increasing along with an increase in estimated arrival time, such as a sum of 1.5th power value of the estimated arrival time.

Though the regenerative power value is included in the computing equations (Equation (6) and Equation (7)) of assigned evaluation indices, the regenerative power value may be omitted from the computing equations of assigned evaluation indices.

While the basic power value is included in the computing equation of assigned evaluation index, the basic power value may be omitted from the computing equation of assigned evaluation index.

Other than the indices shown in Equation (6) and Equation (7), the value obtained by multiplying the other index such as the probability of occurrence of full occupancy by a weighting coefficient may be added in the computing equation of assigned evaluation index.

Though the assigned evaluation index is obtained as a linear sum of various evaluation indices in Equation (6) and Equation (7), it may be obtained using other functional form such as a square sum of various evaluation indices.

The amount of $CO_2$ emissions in power running may be used in place of running power value, and the amount of $CO_2$ emissions in regeneration may be used in place of the regenerative power value. In general, the amounts of $CO_2$ emissions in power running and regeneration are ones obtained by multiplying a running power value and a regenerative power value by the coefficient depending on an electric power company from which a building purchases electric power. That is, the amount of $CO_2$ emissions is used as a value substantially equivalent to the running power value and regenerative power value.

Also after an assigned car is decided in response to a new hall call, the computation as to whether the assigned car by the hall call in which an assigned car has been assigned can be changed periodically with the use of the assigned total evaluation index. The assignment by a hall call in which an assigned car has been decided is provisionally erased, and the assigned total evaluation indices of each car in the cases before and after assignment is performed assuming that the provisionally erased hall call has been generated are computed, whereby a car with a small increment of assigned total evaluation index in the case where assignment has been performed is designated as an assigned car after assignment review. In this case, the car after assignment review may be the originally assigned car.

Figure 10:
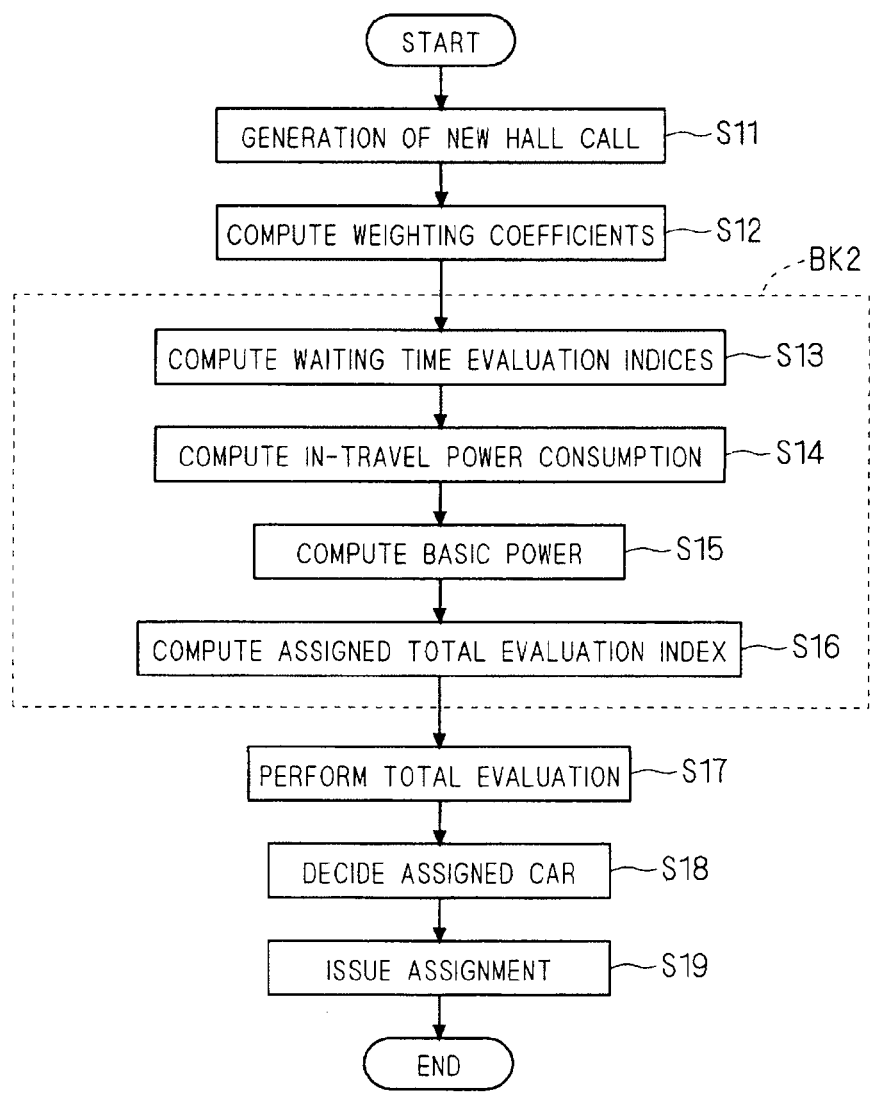
FIG. 10 is a flowchart showing a processing procedure of a method of deciding an assigned car by the elevator group management system according to the second embodiment of the present invention.

FIG. 10 is a flowchart showing a processing procedure of the method of deciding an assigned car by the elevator group management system according to the second embodiment of the present invention. Hereinafter, the method of deciding an assigned car will be descried with reference to this figure.

First, in Step S11, when a hall call is newly generated from any of the hall call registration devices 2A to 2C, the elevator group management system body 100 receives the contents of this hall call. The contents of the hall call are all managed by, for example, a management section (not shown) of the elevator group management system body 100.

Next, in Step S12, as described above, the running power weighting coefficient computing means 22, regenerative power weighting coefficient computing means 32 and basic power weighting coefficient computing means 52 decide the weighting coefficients of running power value, regenerative power value and basic power value, respectively, with reference to the traffic flow state, elevator specifications and building specifications.

Then, in Step S13, the waiting time evaluation indices W(i) in the cases before (case 1 above) and after (case 2 above) a newly generated hall call is assigned to each car are computed.

After that, in Step S14, in-travel power consumption of each car i is computed. That is, as described above, the in-travel power consumption computing section 110 computes the running power value and the regenerative power value of each car i in travel in the case 1 and the case 2.

Then, in Step S15, as described above, the car-based basic power computing means 51 computes the basic power values of each car i in the case 1 and the case 2.

After that, in Step S16, as described above, the car-based assigned total evaluation index computing means 61 computes the assigned total evaluation index before assignment Vbef(i) and the assigned total evaluation index after assignment Vaft(i) by new hall calls of each car i in the case 1 and the case 2.

The computing of Step S13 to Step S16 described above is shown as a repetition block BK2 that is performed for all cars in the case 1 and the case 2 per newly generated hall call.

After computing of the repetition block BK2 is performed on all cars, in Step S17, as described above, the car-based assigned total evaluation index computing means 61 performs total evaluation using an increment value of the assigned total evaluation index shown by Equation (8).

Then, in Step S18, the assigned car deciding means 71 decides an assigned car as described above.

Finally, in Step S19, an assignment is issued to the control device corresponding to the assigned car decided in Step S18 among the car-based control devices 1A to 1D, to thereby control an elevator car.

The elevator group management system according to the second embodiment that has the above-mentioned configuration decides an assigned car with the use of the assigned total evaluation index that has the waiting time evaluation index, power consumption value, and regenerative power value as indices, and accordingly is capable of changing weights of a running power value and a regenerative power value according to the generated traffic flow, elevator specifications and building specifications. This enables the elevator group management system to considerably exert the effect of saving energy without deteriorating the waiting time to a large extent.

That is, the assigned car deciding section composed of the car-based assigned total evaluation index computing means 61 and the assigned car deciding means 171 of the elevator group management system according to the second embodiment decides an assigned car, in response to a newly generated hall car, with the use of a linear sum having positive coefficients of an absolute value of running power and an absolute value of regenerative power. Thus, even when travel is once performed on a regeneration side and power consumption until the last stop in the travel section by a call to be covered is reduced, the effects of an increase in power-running-side power in a future travel section after last stop are taken into account due to the addition of an absolute value of regenerative power. This makes it possible to obtain an effect that energy is saved without deteriorating the waiting time to a large extent. That is, in a case of large regenerative power, it is highly likely that running power will be consumed in future travel to an equal extent. The elevator group management system according to the second embodiment achieves an effect of deciding an assigned car in consideration of the above-mentioned possibility.

Further, in the assigned total evaluation index before assignment Vbef(i) and the assigned total evaluation index after assignment Vaft(i), a square sum of the estimated arrival time is applied to the waiting time evaluation index, and a linear sum is applied to the running power value and the regenerative power value. That is, in the functions of the assigned total evaluation index before assignment Vbef(i) and assigned total evaluation index after assignment Vaft(i), a rate of an increase in slope of the waiting time evaluation index W(i) is set to be larger than the rates of increases in slope of the linear functions of running power value information and regenerative power value information.

Accordingly, during off-peak times when there are a few passengers and the estimated arrival time is short, the running power value and the regenerative power value largely affect the assigned total evaluation index, whereas the waiting time evaluation index largely affects the assigned total evaluation index during peak times when many passengers appear and the estimated arrival time is long. Therefore, it is possible to decide an assigned car with a balance between the waiting time and energy saving in accordance with the degree at which a car becomes crowded with passengers such that during off-peak times with short waiting time, energy is saved while permitting the deterioration of waiting time to some extent, and that during peak times with long waiting time, energy is saved to some extent while hardly deteriorating the waiting time.

In addition, the elevator group management system according to the second embodiment takes into account the in-travel power running loss amount information D13A and in-travel power running loss amount information D13B from the car-based loss computing means 13, and thus there is achieved an effect that the car-based running power computing means 21 and the car-based regenerative power computing means 31 compute power consumption values (running power value and regenerative power value) more accurately.

Further, the car-based basic power computing means 51 also obtains the basic power value, and thus it is possible to evaluate not only the in-travel power consumption but also the basic power used in in-car lighting, an in-car air conditioner and a control panel.

That is, the elevator group management system according to the second embodiment is capable of computing the assigned total evaluation index before assignment Vbef(i) and the assigned total evaluation index after assignment Vaft(i) by the car-based assigned total evaluation index computing means 161, based on the basic power value information D51, by taking more into account the power consumption of in-car lighting, air conditioner and the like that are typically turned off when a car is at rest. Accordingly, it is possible to decide an assigned car based on the more accurate power consumption value.

The elevator group management system according to the second embodiment uses the weighting coefficient of a running power value, weighting coefficient of a regenerative power value and weighting value of a basic power value (kA, kB and kZ) in the assigned total evaluation index before assignment Vbef(i) and the assigned total evaluation index after assignment Vaft(i), and accordingly is capable of computing the assigned total evaluation indices before assignment and after assignment in which a generated traffic flow, elevator specifications and building specifications are reflected.

Further, there is provided the car-based number of between-stop-floors loading people estimating means 11 that estimates the number of between-stop-floors loading people of each car, which makes it possible to accurately compute a work load between stop floors.

That is, the elevator group management system according to the second embodiment is capable of estimating the expected number of between-stop-floors loading people based on the number of between-stop-floors loading people estimation information D11 from the car-based number of between-stop-floors loading people estimating means 11. Therefore, the car-based work load computing means 12 is capable of accurately computing the in-travel power running work load and in-travel regeneration work load based on the number of between-stop-floors loading people estimation information D11. This makes it possible to accurately compute the running power value and regenerative power value by the car-based running power computing means 21 and the running power weighting coefficient computing means 22.

Moreover, an amount of $CO_2$ emissions is applicable in place of a power value, and accordingly it is possible to save energy according to a demand of the owner of a building.

Third Embodiment

Figure 11:
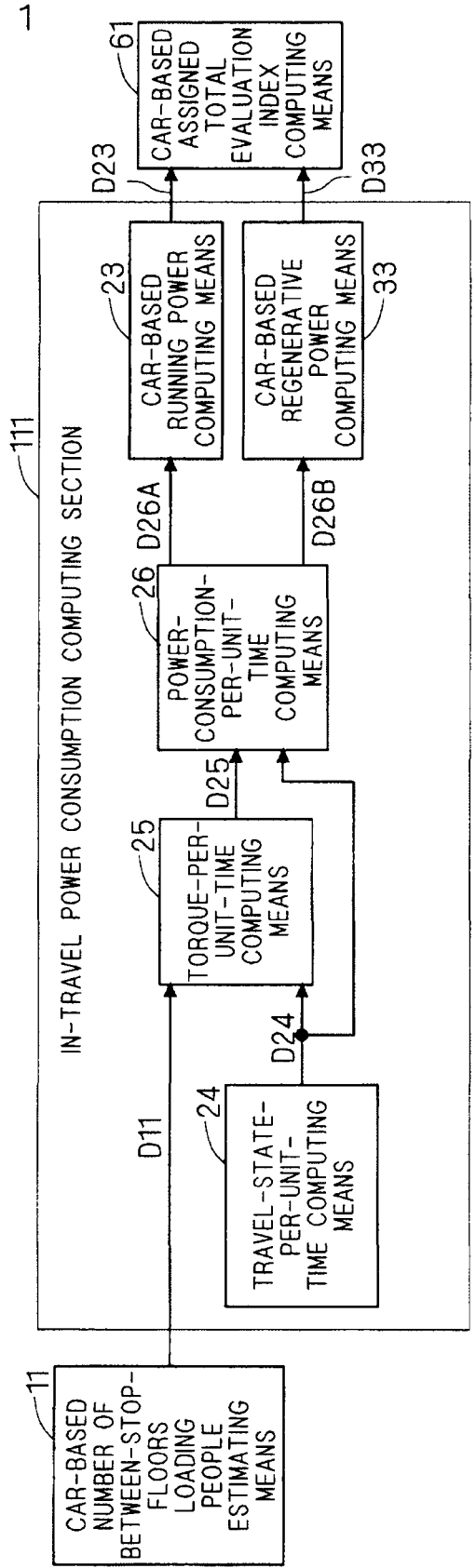
FIG. 11 is a block diagram showing a configuration of an in-travel power consumption computing section and a vicinity thereof in an elevator group management system according to a third embodiment of the present invention.

FIG. 11 is a block diagram showing the configuration of an in-travel power consumption computing section and its vicinity in an elevator group management system according to a third embodiment of the present invention. Note that this configuration is basically similar to that of the elevator group management system according to the second embodiment shown in FIG. 9 except for that the in-travel power consumption computing section 110 according to the second embodiment is replaced with an in-travel power consumption computing section 111.

The in-travel power consumption computing section 111 computes the running power value and regenerative power value of each car on a simulation basis by evaluating a travel state of each car, computing a current value and a voltage value of a motor from the torque per unit time required for a motor of a hoist machine of each car, and aggregating power consumption per unit time. The in-travel power consumption computing section 111 includes travel-state-per-unit-time computing means 24, torque-per-unit-time computing means 25, power-consumption-per-unit-time computing means 26, car-based running power computing means 23 and car-based regenerative power computing means 33.

Next, the operation and internal configuration of the in-travel power consumption computing section 111 will be specifically described. The in-travel power consumption computing section 111 uses, for example, a value of 10 msec as the unit time.

The travel-state-per-unit-time computing means 24 computes a travel state per unit time of each car. Specifically, the "travel state" refers to a speed, acceleration and current position of each car.

Figure 12:
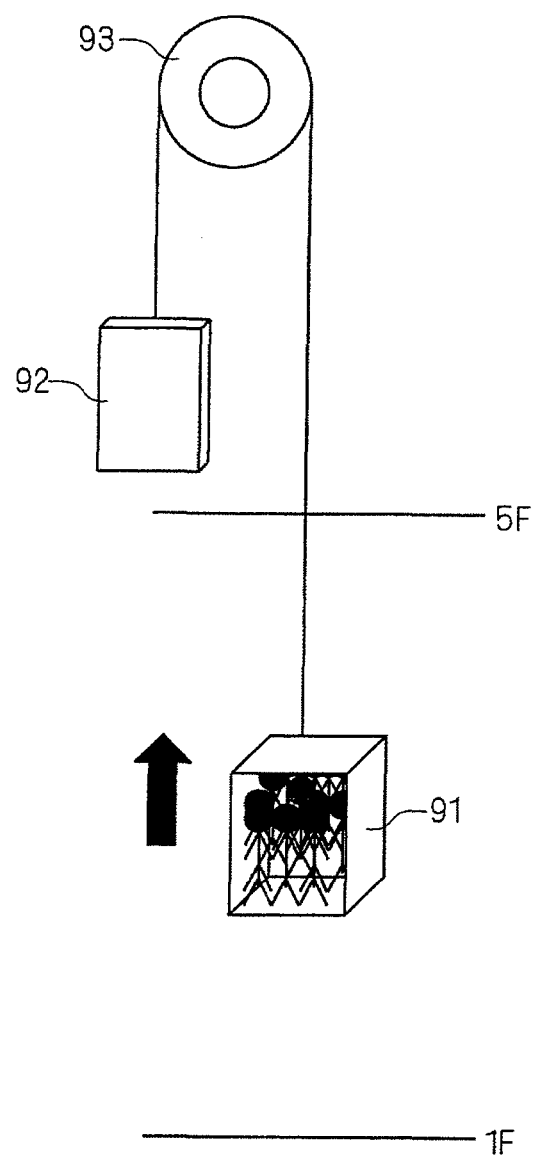
FIG. 12 is an explanatory diagram schematically showing an operation of an elevator.

FIG. 12 is an explanatory diagram schematically showing the operation of the elevator. As shown in this figure, while a car 91 moves from the 1st floor to the 5th floor in an up direction with passengers loaded, the position of the car 91 and the position of a balance weight 92 provided at the end opposite to the car 91 through a hoist machine 93 are individually computed every 10 msec, to thereby obtain the speed and acceleration of the car 91.

As described above, the travel-state-per-unit-time computing means 24 obtains a travel state by computing the positions of each car and a balance weight corresponding thereto per unit time, and outputs travel state information D24 in which a travel state of each car is specified to the torque-per-unit-time computing means 25.

The torque-per-unit-time computing means 25 computes load torque based on a car weight, a count rate, the number of between-stop-floors loading people currently under evaluation, which is obtained from the number of between-stop-floors loading people estimation information D11 from the car-based number of between-stop-floors loading people estimating means 11, and the weight of an imbalanced rope obtained from the travel state information D24. Note that the "count ratio" refers to a ratio of a balance weight to an assumed maximum in-car weight (full occupancy).

Further, the torque-per-unit-time computing means 25 computes acceleration torque from the acceleration of a car that is obtained from the travel state information D24, and computes a torque-per-unit-time value Tq using a computing equation of Equation (9).

[Math 9]

$$Tq = \frac{TqL + TqA}{Mef} \quad (9)$$

In Equation (9), TqL is load torque, TqA is acceleration torque, and Mef is motor efficiency.

Then, the torque-per-unit-time computing means 25 outputs load torque information D25 in which the torque-per-unit-time value Tq is specified to the power-consumption-per-unit-time computing means 26.

The power-consumption-per-unit-time computing means 26 computes the power consumption per unit time using the speed of a car per unit time that is obtained from the travel state information D24 and the torque-per-unit-time value Tq obtained from the load torque information D25. A power value Power per unit time is obtained using Equation (10) below.

[Math 10]

$$\text{Power} = d \frac{|Tq \cdot R(v)|}{Aef} \tag{10}$$

In Equation (10), Tq is a torque-per-unit-time value, v is a car speed, R( ) is a function for converting the car speed into a rotation speed, Aef is a parameter in which the efficiency such as inverter efficiency is taken into account, and d is a parameter that takes "1" during power running and "−1" during regeneration.

Then, the power-consumption-per-unit-time computing means 26 outputs positive power information D26A in which the power-per-unit-time Power per unit time of a positive value is specified to the car-based running power computing means 23, and outputs negative power information D26B in which the power-per-unit-time value of a negative value is specified to the car-based regenerative power computing means 33.

Based on the positive power information D26A obtained from the power-consumption-per-unit-time computing means 26, the car-based running power computing means 23 aggregates values in the case where the power consumption value per unit time is positive, and computes running power values of the travel-expected sections in the cases before and after a new hall call of each car is assigned (case 1 and case 2 above).

Then, the car-based running power computing means 23 outputs running power value information D23 in which the computed running power value is specified to the car-based assigned total evaluation index computing means 61.

Based on the negative power information D26B obtained from the power-consumption-per-unit-time computing means 26, the car-based regenerative power computing means 23 aggregates values in the case where the power consumption value per unit time is negative, and converts regenerative power values of the travel-expected sections in the cases before and after a new hall call of each car is assigned (case 1 and case 2 above), to thereby perform computation.

Then, the car-based regenerative power computing means 33 outputs regenerative power value information D33 in which the computed regenerative power value is specified to the car-based assigned total evaluation index computing means 61.

As in the second embodiment, the car-based assigned total evaluation index computing means 61 computes the assigned total evaluation indices in the cases before and after a new hall call is assigned to each car, with the use of the running power value information D23, regenerative power value information D33 and other indices (running power weighting coefficient information D22, regenerative power weighting coefficient information D32, waiting time evaluation index information D41 and basic power value information D51).

Note that the power-consumption-per-unit-time computing means 26 may add power consumption values at start-up and stop.

Alternatively, the power-consumption-per-unit-time computing means 26 may add the power consumption value of a brake in travel. This is because the brake function of allowing a current to flow does not work in the brake of the hoist machine.

Though the in-travel power consumption computing section 111 computes the running power and regenerative power every time the assigned evaluation index computation of each car is computed, the power consumption may be computed for each combination (of a starting floor, an arriving floor, and the number of loading people) in advance, and the power consumption per stored combination (of a starting floor, an arriving floor, and the number of loading people) may be used as the output (running power value information D23 and regenerative power value information D33) of the in-travel power consumption computing section 111.

Figure 13:
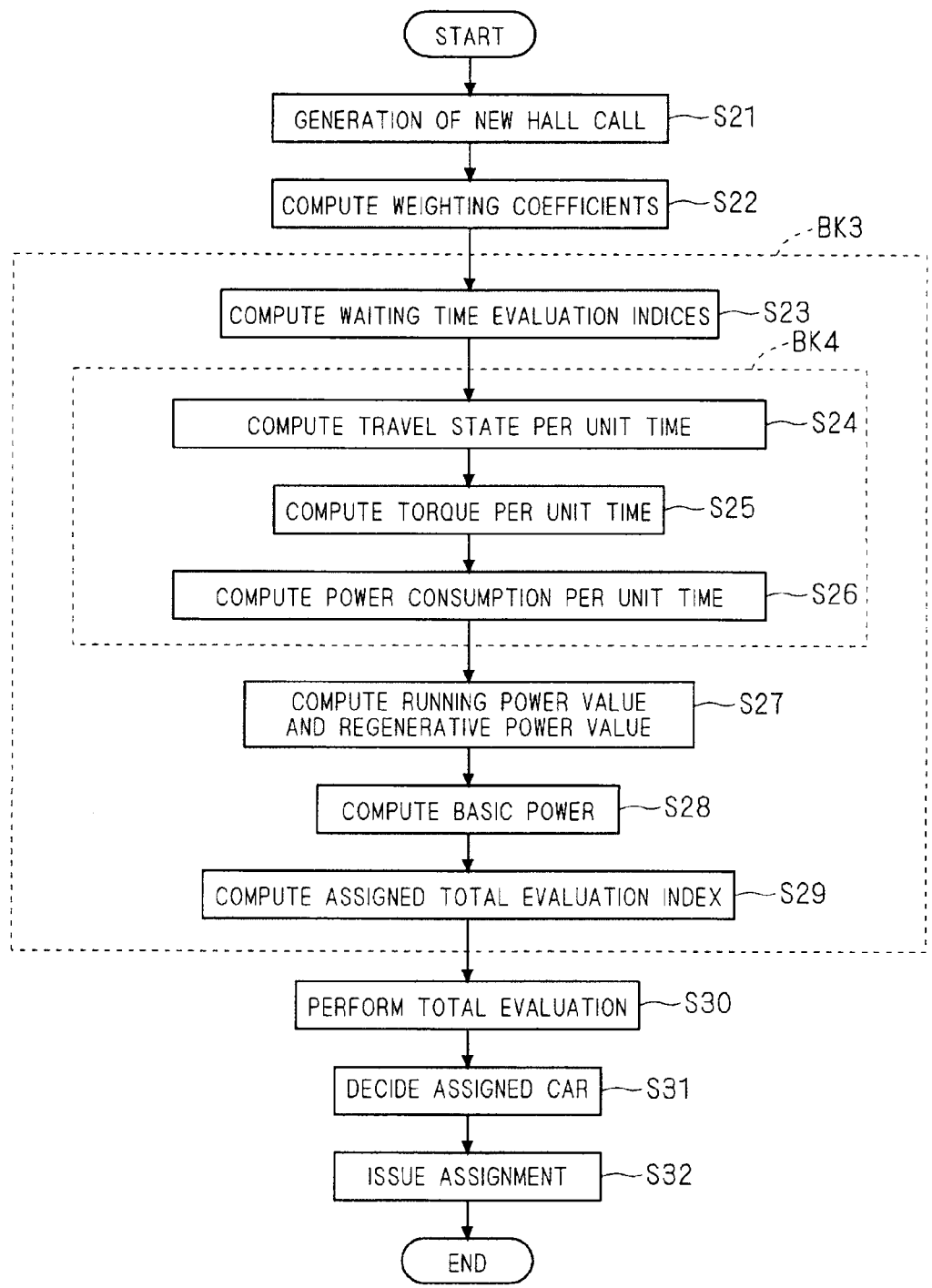
FIG. 13 is a flowchart showing a processing procedure of a method of deciding an assigned car by the elevator group management system according to the third embodiment of the present invention.

FIG. 13 is a flowchart showing a processing procedure of the method of deciding an assigned car by the elevator group management system according to the third embodiment of the present invention. The method of deciding an assigned car will be described below with reference to this figure.

First, in Step S21, when a hall call is newly generated from any of the hall call registration devices 2A to 2C, the elevator group management system body 100 receives the contents of this hall call.

Next, in Step S22, as described above, the running power weighting coefficient computing means 22, regenerative power weighting coefficient computing means 32 and basic power weighting coefficient computing means 52 decide the weighting coefficients of running power value, regenerative power value and basic power value, respectively, with reference to the traffic flow state, elevator specifications and building specifications.

Then, in Step S23, waiting time evaluation indices W(i) in the case before (case 1 above) and after (case 2 above) a newly generated hall call is assigned to each car i are computed.

Next, in Step S24, the travel-state-per-unit-time computing means 24 computes data concerning the travel state of the car position, balance weight position, car speed, and travel state per unit time of car acceleration, as described above.

Then, in Step S25, the torque-per-unit-time computing means 25 computes a torque value per unit time as described above.

Then, in Step S26, the power-consumption-per-unit-time computing means 26 computes a power consumption value per unit time from the torque value and car speed per unit time, as described above.

Step S24 to Step S26 described above is shown as a repetition block BK4 that is repeated per unit time within evaluation time. An extremely short time unit such as 10 msec is applied as the unit time, as described above.

Next, in Step S27, as described above, the car-based running power computing means 23 and car-based regenerative power computing means 33 aggregate the power consumption for all unit time within the evaluation time according to a positive or negative sign, to thereby obtain the running power value and regenerative power value. The evaluation time is the time corresponding to the travel-expected period described above.

Then, in Step S28, the car-based basic power computing means 51 computes the basic power values of each car i in the case 1 and the case 2 as in the second embodiment.

After that, in Step S29, the car-based assigned total evaluation index computing means 61 computes the assigned total evaluation index before assignment Vbef(i) and the assigned total evaluation index after assignment Vaft(i) by new hall calls of each car i in the case 1 and the case 2, as in the second embodiment.

The computing of Step S23 to Step S29 described above is shown as a repetition block BK3 that is performed on all cars in the case 1 and the case 2 per newly generated hall call.

After computing of the repetition block BK3 is performed on all cars, in Step S30, as described above, the car-based assigned total evaluation index computing means 61 performs total evaluation using an increment value of the assigned total evaluation index shown by Equation (8).

Then, in Step S31, the assigned car deciding means 71 decides an assigned car as in the second embodiment.

Finally, in Step S32, as in the second embodiment, an assignment is issued to the control device corresponding to the assigned car decided in Step S31 among the car-based control devices 1A to 1D, to thereby control an elevator car.

The elevator group management system according to the third embodiment that has the above-mentioned configuration individually computes the power consumption for each travel state of an elevator per extremely short unit time, and accordingly is capable of computing the running power value and regenerative power value with accuracy. Further, accurate running power value and regenerative power value are used, which enables the elevator group management system to considerably exert the effect of saving energy without deteriorating the waiting time to a large extent.

That is, the elevator group management system according to the third embodiment is capable of computing, by the in-travel power consumption computing section 111, a power consumption value based on the travel state per extremely short unit time through simulations, and accordingly is capable of computing a power consumption value accurately.

The third embodiment is configured such that the in-travel power consumption computing section 110 according to the second embodiment is replaced with the in-travel power consumption computing section 111. In a similar manner, it is possible to implement the third embodiment with the configuration in which the in-travel power consumption computing section 110 according to the first embodiment is replaced with the in-travel power consumption computing section 111. In this case, however, the flowchart shown in FIG. 13 needs to be appropriately changed so as to conform to the processing procedure of the method of deciding an assigned car according to the first embodiment that is shown in FIG. 1.

While the invention has been shown and described in detail, the foregoing description is in all aspects illustrative and not restrictive. It is therefore understood that numerous modifications and variations can be devised without departing from the scope of the invention.

The invention claimed is:

1. An elevator group management system that decides any of a plurality of cars as an assigned car in response to a newly generated hall call, comprising:

waiting time evaluation index computing means computing a waiting time evaluation index based on an estimated arrival time at a loading floor by the hall call for each of said plurality of cars in a first case before an assignment is made as said assigned car and a second case after an assignment is made as said assigned car, and outputting waiting time evaluation index information in which said waiting time evaluation index is specified;

an in-travel power consumption computing section computing an in-travel power consumption value in a travel-expected section from a current position to a last stop position for each of said plurality of cars in each of said first and second cases, and outputting in-travel power consumption value information in which said in-travel power consumption value is specified, said travel-expected section being expected to be covered by a known call for each car;

an in-future-travel power consumption computing section computing an in-future-travel power consumption value in a predetermined future travel-expected section following the last stop position of the travel-expected section expected to be covered by each car for each of said plurality of cars in each of said first and second cases, and outputting in-future-travel power consumption value information in which said in-future-travel power consumption value is specified; and an assigned car deciding section computing, based on said waiting time evaluation index information, in-travel power consumption value information and in-future-travel power consumption value information, an assigned total evaluation index before assignment and an assigned total evaluation index after assignment for each of said plurality of cars in said first and second cases and deciding, as said assigned car, a car with the smallest value of the assigned total evaluation index after assignment with respect to the assigned total evaluation index before assignment.

2. The elevator group management system according to claim 1, wherein in functions of said assigned total evaluation index before assignment and said assigned total evaluation index after assignment, a rate of an increase in slope of the function of said waiting time evaluation index is larger than a rate of an increase in slope of at least one function of said in-travel power consumption value information and said in-future-travel power consumption value information.

3. The elevator group management system according to claim 1, wherein said predetermined future travel-expected section includes one travel section or a round-trip travel section from the last stop position expected to be covered to a terminal floor remote from the last stop position.

4. The elevator group management system according to claim 1, wherein:

said in-travel power consumption computing section includes:

work load computing means computing, based on the expected number of loading people in said travel-expected section of each car, in-travel power running work loads and in-travel regeneration work loads in said travel-expected section by an elevator hoist machine for each of said plurality of cars in said first and second cases, and outputting in-travel power running work load information and in-travel regeneration work load information in which said in-travel power running work loads and said in-travel regeneration work loads are specified;

loss computing means computing, based on said in-travel power running work load information, said in-travel regeneration work load information, and at least one of a loss value of said elevator hoist machine, a loss value of a power supply, a loss value of a mechanical system, a loss value at start-up and a loss value at stop, in-travel power running loss amounts and in-travel regeneration loss amounts in said travel-expected section for each of said plurality of cars in said first and second cases, and outputting in-travel power running loss amount information and in-travel regeneration loss amount information in which said in-travel power running loss amounts and said in-travel regeneration loss amounts are specified;

running power computing means computing, based on said in-travel power running work load information and said in-travel power running loss amount information, an in-travel running power value in said travel-expected section of each car in each of said first and second cases, and outputting in-travel running power value information in which said in-travel running power value is specified; and regenerative power computing means computing, based on said in-travel power regeneration work load information and said in-travel power regeneration loss amount information, an in-travel regenerative power value in said travel-expected section of each car in each of said first and second cases, and outputting in-travel regenerative power information in which said in-travel regenerative power value is specified; and said in-travel power consumption value information includes said in-travel running power value information and said in-travel regenerative power value information.

5. The elevator group management system according to claim 1, further comprising:

weighting coefficient computing means outputting weighting coefficient information in which at least one of a weighting coefficient of said in-travel power consumption value information and a weighting coefficient of said in-future-travel power consumption value information is specified, using at least one value of a height of a building for installation, the number of stop floors, a traffic flow index in each time period, the number of cars managed as a group, and a car speed, wherein said assigned car deciding section further computes said assigned total evaluation index before assignment and said assigned total evaluation index after assignment based on said weighting coefficient information.

6. The elevator group management system according to claim 1, further comprising:

basic power computing means computing a basic power value including power consumption of at least one device of in-car lighting, in-car air conditioner and a control panel for each of said plurality of cars in said first and second cases, and outputting basic power value information in which said basic power value is specified, wherein said assigned car deciding section further computes said assigned total evaluation index before assignment and said assigned total evaluation index after assignment based on said basic power value information.

7. The elevator group management system according to claim 4, further comprising:

number of between-stop-floors loading people estimating means estimating the number of between-stop-floors loading people in said travel-expected section for each of said plurality of cars in each of said first and second cases, and outputting number of between-stop-floors loading people estimation information in which the estimated number of people loading between the each stop floors is specified, wherein said work load computing means computes said in-travel power running work load and in-travel regeneration work load based on said number of between-stop-floors loading people estimation information.

8. The elevator group management system according to claim 7, further comprising:

hall destination floor registration devices capable of registering destination floors in a hall, wherein said number of between-stop-floors loading people estimating means estimates said number of people loading between the each stop floors based on information regarding the destination floors, said information being obtained from said hall destination floor registration devices.

9. An elevator group management system that decides any of a plurality of cars as an assigned car in response to a newly generated hall call, comprising:

waiting time evaluation index computing means computing a waiting time evaluation index based on an estimated arrival time at a loading floor by the hall call for each of said plurality of cars in a first case before an assignment is made as said assigned car and a second case after an assignment is made as said assigned car, and outputting waiting time evaluation index information in which said waiting time evaluation index is specified;

running power computing means computing a positive running power value in a travel-expected section from a current position to a last stop position for each of said plurality of cars in each of said first and second cases, and outputting running power value information in which said running power value is specified, said travel-expected section being expected to be covered by each car;

regenerative power computing means computing a regenerative power value in said travel-expected section of each car for each of said plurality of cars in each of said first and second cases, and outputting positive regenerative power value information in which said regenerative power value is specified; and an assigned car deciding section computing, using functions in which slopes with respect to respective values of said waiting time evaluation index information, running power value information and regenerative power value information are positive, an assigned total evaluation index before assignment and an assigned total evaluation index after assignment of each of said plurality of cars in said first and second cases, and deciding, as said assigned car, a car with the smallest value of the assigned total evaluation index after assignment with respect to the assigned total evaluation index before assignment.

10. The elevator group management system according to claim 9, wherein in functions of said assigned total evaluation index before assignment and said assigned total evaluation index after assignment, a rate of an increase in slope of the function of said waiting time evaluation index is larger than a rate of an increase in slope of at least one function of said running power value information and said regenerative power value information.

11. The elevator group management system according to claim 9, further comprising:

work load computing means computing, based on the expected number of loading people in said travel-expected section of each car, in-travel power running work load and in-travel regeneration work load in said travel-expected section by an elevator hoist machine for each of said plurality of cars in said first and second cases, and outputting in-travel power running work load information and in-travel regeneration work load information in which said in-travel power running work load and said in-travel regeneration work load are specified; and loss computing means computing, based on said in-travel power running work load information, said in-travel regeneration work load information, and at least one of a loss value of said elevator hoist machine, a loss value of a power supply, a loss value of a mechanical system, a loss value at start-up and a loss value at stop, an in-travel power running loss amount and an in-travel regeneration loss amount in said travel-expected section for each of said plurality of cars in said first and second cases, and outputting in-travel power running loss amount information and in-travel regeneration loss amount information in which said in-travel power running loss amount and said in-travel regeneration loss amount are specified, wherein said running power computing means outputs said running power value information based on said in-travel power running work load information and said in-travel power running loss amount information, and said regenerative power computing means outputs said regenerative power value information based on said in-travel regeneration work load information and said in-travel regeneration loss amount information.

12. The elevator group management system according to claim 9, further comprising:

weighting coefficient computing means outputting weighting coefficient information in which at least one of a weighting coefficient of running power and a weighting coefficient of regenerative power, using at least one value of a height of a building for installation, the number of stop floors, a traffic flow index in each time period, the number of cars managed as a group, and a car speed, wherein said assigned car deciding section further computes said assigned total evaluation index before assignment and said assigned total evaluation index after assignment based on said weighting coefficient information.

13. The elevator group management system according to claim 9, further comprising:

basic power computing means computing a basic power value including power consumption of at least one device of in-car lighting, in-car air conditioner and a control panel for each of said plurality of cars in said first and second cases, and outputting basic power value information in which said basic power value is specified, wherein said assigned car deciding section further computes said assigned total evaluation index before assignment and said assigned total evaluation index after assignment based on said basic power value information.

14. The elevator group management system according to claim 11, further comprising:

number of between-stop-floors loading people estimating means estimating the number of between-stop-floors loading people in said travel-expected section for each of said plurality of cars in each of said first and second cases, and outputting number of between-stop-floors loading people estimation information in which the estimated number of people loading between the each stop floors is specified, wherein said work load computing means computes said in-travel power running work load and in-travel regeneration work load based on said number of between-stop-floors loading people estimation information.

15. The elevator group management system according to claim 14, further comprising:

hall destination floor registration devices capable of registering destination floors in a hall, wherein said number of between-stop-floors loading people estimating means further estimates the number of between-stop-floors loading people based on information regarding the destination floors, said information being obtained from said hall destination floor registration devices.

16. The elevator group management system according to claim 9, further comprising:

travel-state-per-unit-time computing means computing a travel state being at least one value of a car position of each car, a position of a balance weight, car acceleration and car speed per unit time and outputting travel state information in which said travel state is specified per unit time;

torque-per-unit-time computing means computing a torque value of each car per said unit time based on said travel state information and outputting torque information in which said torque value per said unit time is specified; and power-consumption-per-unit-time computing means computing power consumption of each car per unit time based on said travel state information and said torque information and outputting positive power information in which positive power consumption is specified per unit time or negative power information in which negative power consumption is specified, wherein said running power computing means outputs said running power value information based on said positive power information, and said regenerative power computing means outputs, based on said negative power information, said regenerative power value information by conversion into a positive value.

* * * * *